(12) United States Patent
Nishida et al.

(10) Patent No.: US 8,070,294 B2
(45) Date of Patent: *Dec. 6, 2011

(54) PROJECTOR

(75) Inventors: Kazuhiro Nishida, Matsumoto (JP); Osamu Ishibashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,767

(22) Filed: Apr. 13, 2011

(65) Prior Publication Data

US 2011/0194078 A1 Aug. 11, 2011

Related U.S. Application Data

(63) Continuation of application No. 12/458,340, filed on Jul. 8, 2009, now Pat. No. 7,946,709, which is a continuation of application No. 11/703,146, filed on Feb. 7, 2007, now Pat. No. 7,575,326.

(30) Foreign Application Priority Data

Feb. 20, 2006 (JP) ................................. 2006-042955

(51) Int. Cl.
  *G03B 21/14* (2006.01)
  *F21S 8/00* (2006.01)
(52) U.S. Cl. .......................................... 353/20; 362/268
(58) Field of Classification Search .................... 353/20; 359/483, 642; 362/19, 268, 244, 332
See application file for complete search history.

(56) References Cited

U.S. PATENT DOCUMENTS

| | | | |
|---|---|---|---|
| 6,431,727 B1 | 8/2002 | Sugawara et al. | |
| 6,513,953 B1 | 2/2003 | Itoh | |
| 7,575,236 B1 * | 8/2009 | Haber | 273/292 |
| 7,575,326 B2 | 8/2009 | Nishida et al. | |
| 2002/0060780 A1 | 5/2002 | Takezawa et al. | |
| 2003/0002151 A1 | 1/2003 | Yano | |
| 2003/0174294 A1 | 9/2003 | Yanagisawa | |
| 2004/0165151 A1 | 8/2004 | Kitabayashi et al. | |
| 2005/0041215 A1 | 2/2005 | Fujimori | |
| 2005/0185144 A1 | 8/2005 | Imahase et al. | |
| 2007/0188714 A1 * | 8/2007 | Fuse et al. | 353/20 |
| 2007/0189016 A1 | 8/2007 | Yamauchi et al. | |

FOREIGN PATENT DOCUMENTS

| | | |
|---|---|---|
| EP | 0 957 387 A1 | 11/1999 |
| EP | 1 519 590 A1 | 3/2005 |
| JP | A-10-111472 | 4/1998 |
| JP | A-10-325954 | 12/1998 |
| JP | A-2005-62900 | 3/2005 |
| JP | A-2005-234126 | 9/2005 |
| JP | A-2007-78951 | 3/2007 |
| JP | A-2007-219442 | 8/2007 |

* cited by examiner

*Primary Examiner* — John A Ward
(74) *Attorney, Agent, or Firm* — Oliff & Berridge, PLC

(57) ABSTRACT

A projector having a first lens array with a plurality of first lenses in a plane substantially orthogonal to an optical axis of the light beam from a light source that divides the light beam into a plurality of partial light beams, a second lens array having a plurality of second lenses corresponding to the plurality of first lenses, and a polarization converter that is disposed on a light beam emitting-side of the first lens array. A focal position in a first direction of the first lens is set in the vicinity of the second lens array in the optical direction of the light beam irradiated from the first lens. A focal position in the second direction of the first lens is set in the vicinity of the polarization converter in the optical direction of the light beam irradiated from the first lens.

12 Claims, 12 Drawing Sheets

PROJECTOR

This is a Continuation of application Ser. No. 12/458,340 filed on Jul. 8, 2009, which in turn is a continuation of application Ser. No. 11/703,146 filed on Feb. 7, 2009. The disclosure of the prior application is hereby incorporated by reference in its entirety. The entire disclosure of Japanese Patent Application No. 2006-42955, filed Feb. 20, 2006, is expressly incorporated by reference herein.

BACKGROUND

1. Technical Field

The present invention relates to a projector that includes a light source, an optical modulator that modulates a light beam irradiated from the light source in accordance with image information to form an image and a projection optical system that projects the formed image.

2. Related Art

There have been known projectors that form an optical image in accordance with image information and project the optical image on a screen or the like in an enlarged manner. Among such projectors, there is known a projector that includes a light source, an optical modulator that modulates a light beam irradiated from the light source in accordance with image information and a projection lens that projects the modulated light beam as an optical image.

Recently, so-called three-panel projectors have been proposed, which can form an image with enhanced image quality and color reproducibility. Such a three-panel projector includes: a color-separating optical system that separates a light beam irradiated from a lamp as a light source into three color light beams of red (R), green (G) and blue (B); a plurality of liquid crystal panels as optical modulators which modulate the incident color light beams in accordance with image information; and a color-combining optical device that combines the color light beams modulated by the liquid crystal panels to form an optical image.

Note that it is necessary to uniformly illuminate an image formation area of an optical modulator such as a liquid crystal panel. Accordingly, there has been known a projector with an integrator illuminating optical system that divides a light beam irradiated from the lamp into a plurality of partial light beams, superpose the partial light beams on the image formation areas of the optical modulators and uniformly illuminate the image formation areas (see, for example, JP-A-2005-234126).

The projector disclosed in the document includes as the integrator illuminating optical system a first lens array having a plurality of small lenses arranged in a matrix form, a second lens array having a plurality of small lenses respectively corresponding to the plurality of small lenses of the first lens array, a polarization converter that aligns polarization directions of light beams respectively irradiated from the plurality of small lenses of the second lens array and a superposing lens that superposes the incident light beams from the polarization converter on the image formation areas of the liquid crystal panels, each component being in a plane orthogonal to the optical axis of the light beam irradiated from the lamp. The integrator illuminating optical system uniforms a light amount on an illumination region of the light beam irradiated from the lamp, so that the image formation areas of the liquid crystal panels can be uniformly illuminated.

However, a light emitting portion of the light source lamp of such a projector may be moved from the middle of the electrodes of the light source lamp. When the light emitting portion is moved after optical components of the projector are positioned and fixed, a formed optical image may contain color unevenness.

To avoid the problem, there have been demands for a projector that can reduce luminance unevenness on the image formation area of the optical modulator even when the light emitting portion of the light source lamp is moved substantially from the middle of the electrodes after the positioning and fixation of the optical components.

SUMMARY

An exemplary aspect of the present invention provides a projector which reduces luminance unevenness on an image formation area even when a light emitting portion of a light source lamp is moved after positioning and fixation of an optical component.

A projector of an exemplary aspect of the present invention includes a light source, an optical modulator which modulates a light beam irradiated from the light source in accordance with image information to form an optical image and a projection optical system which projects the formed optical image. The projector includes an integrator illuminating optical system which equalizes the light beam irradiated from the light source and uniformly illuminates an image formation area of the optical modulator. The integrator illuminating optical system includes: a first lens array having a plurality of first lenses in a plane substantially orthogonal to an optical axis of the light beam irradiated from the light source and divides the light beam into a plurality of partial light beams by the plurality of first lenses; a second lens array having a plurality of second lenses corresponding to the plurality of first lenses of the first lens array; and a polarization converter which is disposed on a light beam emitting-side of the first lens array and aligns a polarization direction of the light beam irradiated from the first lens array into a substantially uniform type. The polarization converter includes at least one polarization separating layer, at least one reflection layer and a phase layer which is disposed at a position corresponding to either the polarization separating layer or the reflection layer. The lengthwise direction of the polarization separating layer in a plane substantially orthogonal to the optical axis of the light beam irradiated from the light source is defined as a first direction. The polarization separating layer transmits light having one polarization direction of an incident light beam and reflects light having another polarization direction. The polarization separating layer and the reflection layer are alternately arranged in a second direction. The second direction is orthogonal to the optical axis of the light beam irradiated from the light source and the first direction. The reflection layer reflects the polarized light reflected by the polarization separating layer into a common direction to that of the polarized light passed through the polarization separating layer. The phase layer converts the polarization direction of the incident polarized light into another polarization direction. A focal position in the first direction of the first lens is set in the vicinity of the second lens array in the optical axis direction of the light beam irradiated from the first lens. A focal position in the second direction of the first lens is set in the vicinity of the polarization converter in the optical axis direction of the light beam irradiated from the first lens.

According to the exemplary aspect of the invention, even when the light emitting portion is moved in the light source, luminance unevenness on the image formation area of the optical modulator can be reduced.

Specifically, since the focal position in the second direction of the plurality of first lenses of the first lens array is set in the vicinity of the polarization converter in the optical axis direction of the light beam irradiated from the first lens, the light beam irradiated from the first lens is incident on the polarization converter in a narrow illumination region. When the light emitting portion of the light source is moved in the second direction in which the polarization separating layer and the reflection layer of the polarization converter are aligned, substantially no light of the partial light beams generated from the light irradiated from an end position of the light emitting portion on the movement direction side and transmitted through the first lens is incident on the light incident surface of the polarization converter, while substantially all the light of the partial light beams generated from the light irradiated from a position in the vicinity of the center of the light emitting portion and transmitted through the first lens is incident on the light incident surface of the polarization converter. That is, the partial light beams generated from each light irradiated from different positions in the light emitting portion are not incident on the light incident surface at different rates. Substantially all the light of certain partial light beams out of the partial light beams generated from the light irradiated from different positions in the light emitting portion is incident on the light incident surface of the polarization converter.

Accordingly, substantially all the light of the partial light beams generated from the light irradiated from a certain position in the light emitting portion is superposed and incident on the image formation area of the optical modulator, thereby preventing a large difference in illumination intensity (luminance) between the one end position side and the other end position side in the second direction of the image formation area, compared with the case in which the partial light beams of which light is partially reduced on the one end position side in the second direction is superposed on the image formation area of the optical modulator. Hence, the luminance unevenness can be reduced on the image formation area of the optical modulator.

Since the focal position in the first direction of the first lens is set in the vicinity of the second lens array on the optical axis of the light beam irradiated from the first lens, the partial light beams irradiated from the first lens are incident on a narrow illumination region of a corresponding second lens on which the partial light beams are to be incident. When the light emitting portion of the light source is moved in the first direction orthogonal to the second direction in a plane orthogonal to the optical axis of the light beam irradiated from the light source, the partial light beams generated from the light irradiated from a position on an outer side of the light emitting portion in the movement direction are not incident on the corresponding second lens. Incident on the corresponding second lens are only the partial light beams generated from the light irradiated from a position in the vicinity of the center of the light emitting portion and from an end on the other side which is opposite to the movement direction.

Accordingly, similarly to the above-described case, substantially all the partial light beams generated from the light irradiated from different positions in the light emitting portion are not incident on the corresponding second lens at different rates, but substantially all the light of certain partial light beams out of the partial light beams generated from each light irradiated from different positions in the light emitting portion is incident on the corresponding second lens. As described above, the partial light beams incident on the corresponding second lens are superposed on the image formation area of the optical modulator by a superposing lens, thereby preventing a large difference in illumination intensity (luminance) between the one end position side and the other end position side in the first direction of the image formation area, compared with the case in which the partial light beams of which light is partially reduced on the one end position side in the first direction is superposed on the image formation area of the optical modulator. Hence, the luminance unevenness can be reduced on the image formation area.

According to an exemplary aspect of the invention, the projector may preferably include: a color-separating optical system which separates the light beam irradiated from the integrator illumination optical system into a plurality of color light beams. The optical modulator is provided for each of the plurality of color light beams, the optical modulators being disposed on each optical path of the plurality of color light beams. The projector may further include: at least one color-combining optical device which is provided on the downstream on the optical path of the optical modulators. The color combining optical device combines the plurality of color light beams irradiated from the optical modulators.

An example of such a color-separating optical system is a system with a dichroic mirror that transmits a color light beam of a predetermined wavelength and reflect a color light beam of the other wavelength and with a total reflection mirror that totally reflects the incident light beam. An example of such a color-combining optical device is a device with a cross dichroic prism or a plurality of dichroic mirrors.

The projector according to the exemplary aspect of the invention, in which the color light beams separated by the color-separating optical system are modulated by the plurality of optical modulators and the modulated color light beams are combined into an optical image by the color-combining optical device, can form a color image with reduced color unevenness.

When the color-separating optical system includes the dichroic mirror and the total reflection mirror, the light beams incident on the color-separating optical system are repeatedly reflected by the mirrors in the color-separating process of the color light beams in accordance with wavelengths. Hence, as described above, when the position of the light emitting portion of the light source is moved substantially from the middle of the electrodes, causing unevenness in illumination intensity (luminance) in the illumination region of the light beam irradiated from the light source, a higher side and a lower side of illumination intensity (luminance) on the image formation area may be not aligned between the optical modulators. In this case, in the image passing through the image formation areas and combined by the color-combining optical device, a higher side and a lower side of the illumination intensity may differ between an image derived from a certain color light beam and another image derived from another color light beam, thereby possibly causing color unevenness on the formed image.

In contrast, even when the position of the light emitting portion in the light source is moved, the image formation area is substantially uniformly illuminated by the integrator illuminating optical system, so that the luminance unevenness on the image formation area can be reduced and an image without brightness unevenness can be formed on the image formation area. Accordingly, by combining the images without brightness unevenness, an optical image (a color image) can be formed while reducing color unevenness.

Hence, color unevenness can be reduced in forming an optical image even when the plurality of optical modulators for modulating the incident color light and the color-combining optical system for combining the color light modulated by the plurality of optical modulators to form an optical image are provided.

According to an exemplary aspect of the invention, the first lens is preferably a toric lens.

According to the exemplary aspect of the invention, the toric lens employed as the first lens easily enables the arrangement in which the first lens has the different focal positions in the first and second direction. Hence, such arrangement facilitates the manufacturing of the first lens array and simplifies the structure.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

1. First Exemplary Embodiment

A first exemplary embodiment of the invention will be described below with reference to the attached drawings.

1 Structure of Projector 1

Figure 1:
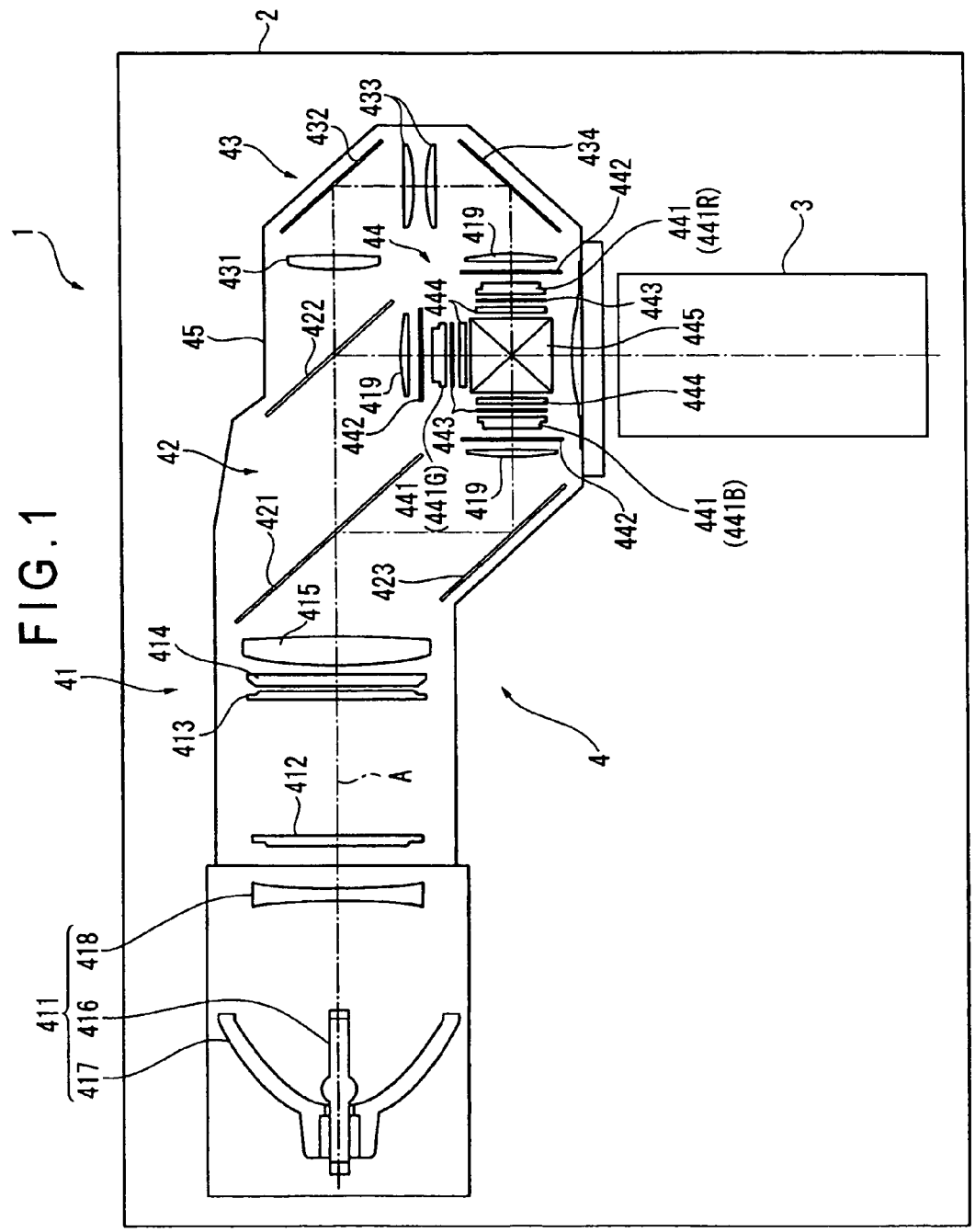
FIG. 1 is a schematic illustration briefly showing a structure of a projector of a first exemplary embodiment of the invention.

FIG. 1 is a schematic illustration briefly showing a structure of a projector 1 of the first exemplary embodiment.

The projector 1 modulates a light beam irradiated from a light source in accordance with image information to form an optical image and projects the formed optical image on a screen (not shown) in an enlarged manner. As shown in FIG. 1, the projector 1 includes an exterior cashing 2, a projection lens 3 as a projection optical device and an optical unit 4.

In FIG. 1, disposed in the space not occupied by the projection lens 3 and the optical unit 4 in the exterior cashing 2 are a cooling unit having a cooling fan for cooling the inside of the projector 1, a power unit for supplying electricity to components in the projector 1, a control device for controlling the whole projector 1 and the like (all not shown).

The exterior cashing 2 is made of synthetic resin substantially in a rectangular parallelepiped shape as a whole and accommodates the projection lens 3 and the optical unit 4 as shown in FIG. 1. Although not shown in the figures, the exterior cashing 2 includes an upper case forming a top surface, a front surface, a rear surface, right and left lateral surfaces of the projector 1 and a lower case forming a bottom surface, the front surface and the rear surface of the projector 1. The upper case and the lower case are fixed to each other with a screw or the like.

The material of the exterior cashing 2 is not limited to synthetic resin but may be, for example, metal.

The optical unit 4, which is under control of the control device, optically processes the light beam irradiated from the light source to form an optical image (a color image) in accordance with image information. As shown in FIG. 1, the optical unit 4 extends along the rear surface and the lateral surface of the exterior cashing 2 in a substantially L shape.

The projection lens 3 is a projection optical system that projects the optical image (the color image) formed by the optical unit 4 on the screen (not shown) in an enlarged manner. The projection lens 3 may be a lens set of a plurality of lenses arranged in a cylindrical lens barrel.

2 Structure of Optical Unit 4

As shown in FIG. 1, the optical unit 4 includes an illumination optical device 41, a color-separating optical device 42, a relay optical device 43, an electrooptical device 44 and an optical component cashing 45 that accommodates the optical components 41 to 44 and supports the projection lens 3 at a predetermined position in a fixed manner.

Figure 2:
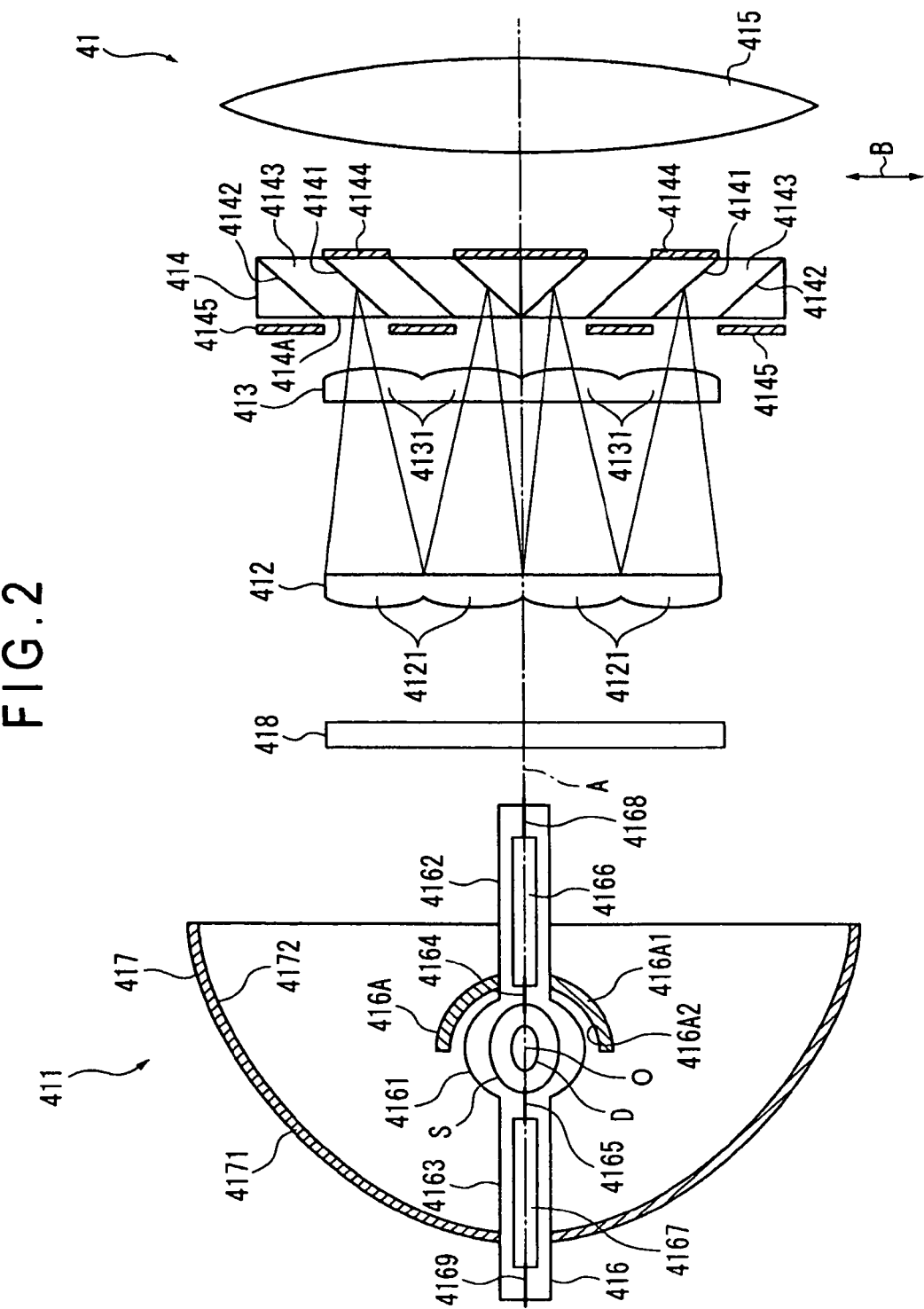
FIG. 2 is a schematic illustration showing a focal position in a second direction of a first lens of the first exemplary embodiment.
Figure 3:
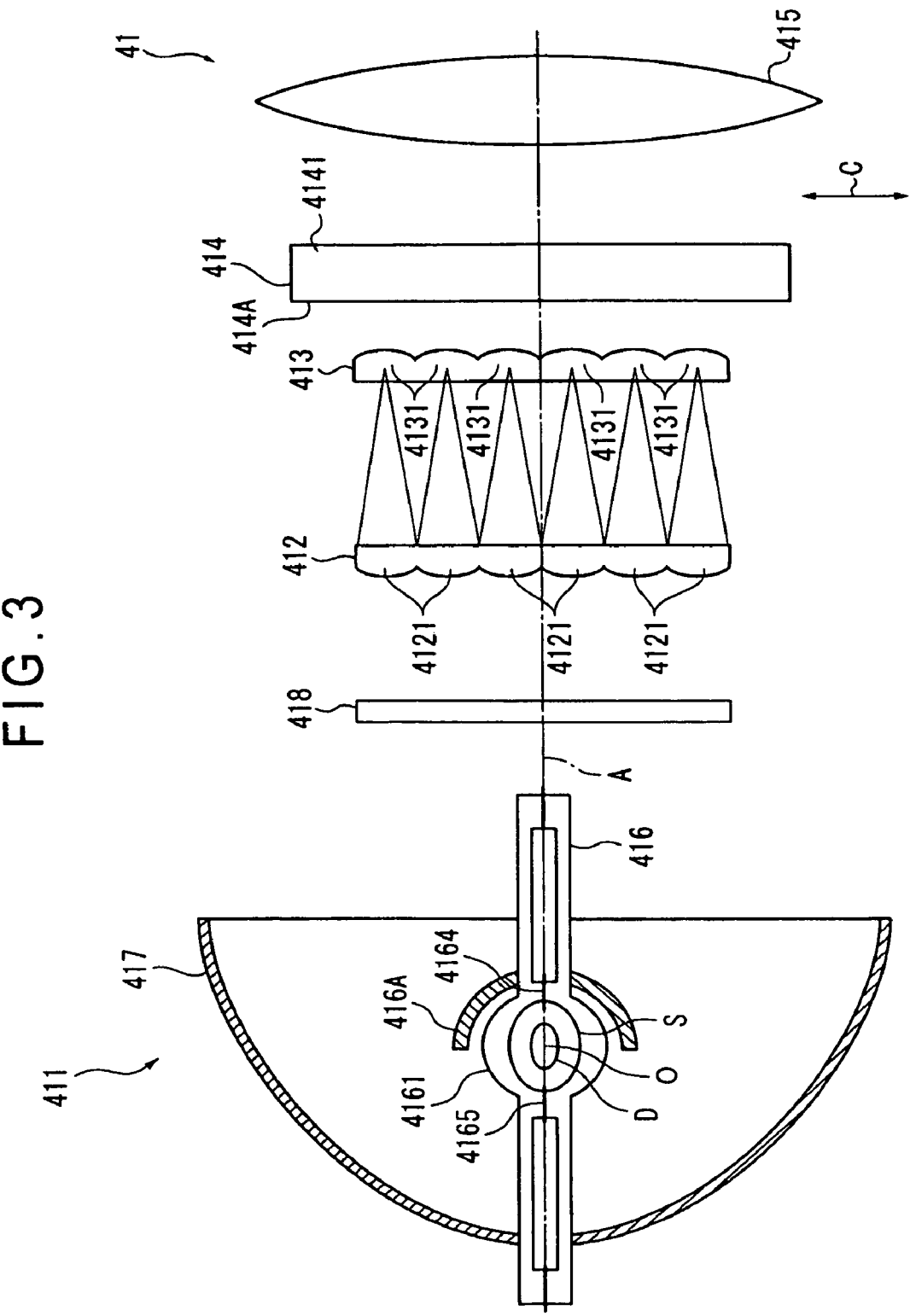
FIG. 3 is a schematic illustration showing a focal position in a first direction of the first lens of the first exemplary embodiment.

FIG. 2 is a schematic illustration showing the illumination optical device 41 seen from an upper side. FIG. 3 is a schematic illustration showing the illumination optical device 41 seen in a horizontal direction.

The illumination optical device 41 almost uniformly illuminates an image formation area of a liquid crystal panel 441 (described later) of the electrooptical device 44. As shown in FIG. 1, the illumination optical device 41 includes a light source device 411, a first lens array 412, a second lens array 413, a polarization converter 414 and a superposing lens 415.

As shown in FIGS. 1 to 3, the light source device 411 includes a light source lamp 416 that irradiates a radial light beam, a reflector 417 that reflects the radial light beam irradiated by the light source lamp 416 to converge the radial light beam at a predetermined position and a collimating lens 418 that parallelizes the light beam converged by the reflector 417 relative to an illumination optical axis A.

The light source lamp 416 includes a silica glass tube. As shown in FIGS. 2 and 3, the light source lamp 416 includes a tubular spherical portion 4161 that bulges in a substantially spherical shape at a middle portion and a pair of sealing portions 4162, 4163 extending in directions apart from each other from each end of the tubular spherical portion 4161. Note that in FIG. 3, only some components are given numeral references. In the tubular spherical portion 4161, a discharge space S is formed in which a pair of electrodes 4164, 4165, mercury, a noble gas and a small amount of halogen are sealed.

The light source lamp 416 may be any lamp selected from various light source lamps capable of emitting light with high brightness such as a metal halide lamp, a high-pressure mercury lamp and an extra high-pressure mercury lamp.

In addition to the pair of electrodes 4164, 4165, inserted in the pair of sealing portions 4162, 4163 are metal foils 4166, 4167 that are made of molybdenum and electrically connected to the pair of electrodes 4164, 4165. The pair of sealing portions 4162, 4163 is sealed by a glass material or the like. Also connected to the metal foils 4166, 4167 are lead wires 4168, 4169 (electrode-connecting wires) which extend to the outside of the light source device 411. Applying a voltage on the lead wires 4168, 4169 generates via the metal foils 4166, 4167 a potential difference between the pair of electrodes 4164, 4165 to discharge, so that a light emitting portion D is generated, thereby lighting the tubular spherical portion 4161 as shown in FIGS. 2 and 3.

As shown in FIG. 2, the reflector 417 is attached to the sealing portion 4163 of the light source lamp 416 (on a base end side in the light beam irradiation direction). The reflector 417 is a light-transmissive molded article of glass with a reflecting portion 4171 in a concave curved surface shape. A reflecting surface 4172 is provided on the light source lamp 416 side of the reflecting portion 4171. The reflecting surface 4172 is formed by metal film deposition on a glass surface having a rotary ellipsoidal surface shape. The reflector 417 is an ellipsoidal reflector with the rotary ellipsoidal surface in the first exemplary embodiment but may be a parabolic reflector with a rotary parabolic surface. When employing the parabolic reflector, the collimating lens 418 is omitted.

The light source lamp 416 in the reflecting portion 4171 of the reflector 417 is disposed with the center O of the light emitting portion D in a normal state positioned in the vicinity of a first focal position of the rotary ellipsoidal surface shape of the reflecting surface 4172 of the reflector 417. When the light source lamp 416 is turned on, among light beams irradiated by the light emitting portion D a light beam irradiated toward the reflector 417 is reflected on the reflecting surface 4172 of the reflector 417 to be a convergent light beam that is converged at a second focal position of the rotary ellipsoidal surface.

As shown in FIG. 2, a sub reflection mirror 416A is provided to the light source lamp 416. The sub reflection mirror 416A is attached to the sealing portion 4162 on the other side of the light source lamp 416 (i.e. to the sealing portion 4162 on the opposite side of the reflector 417 side). A reflecting portion 416A1 of a substantially hemispherical surface shape is formed on the sub reflection mirror 416A.

The reflecting portion 416A1 is formed in a substantially cup shape so as to cover substantially a front half of the tubular spherical portion 4161 of the light source lamp 416 (the front half on the light beam irradiation side). A hemispherical reflecting surface 416A2 is formed on the reflecting portion 416A1 such that an inner surface of the hemispherical reflecting surface 416A2 curves along the spherical surface of the tubular spherical portion 4161 of the light source lamp 416.

By attaching the sub reflection mirror 416A on the light source lamp 416, a light beam radiated toward the front side among the light beams radiated from the light emitting portion D of the light source lamp 416 is reflected by the sub reflection mirror 416A toward the light emitting portion D to be incident on the reflector 417 similarly to the light beam. directly irradiated from the light source lamp 416 to the reflecting surface 4172 of the reflector 417. The light beam is then converged at the second focal position.

The light beam converged by the reflector 417 is converted by the collimating lens 418 into a parallel light substantially parallel to the illumination optical axis A. Thus, the central axis of the illumination light beam irradiated from the light source device 411 is aligned with the illumination optical axis A.

As shown in FIGS. 2 and 3, the first lens array 412 includes first lenses 4121 (a plurality of small lenses) arranged in a matrix form in a plane substantially orthogonal to the illumination optical axis A. The first lenses 4121 each have a substantially rectangular shape when seen in the direction of the illumination optical axis A. The first lens 4121 divides the light beam irradiated from the light source device 411 into a plurality of partial light beams. A focal position of the first lenses 4121 of the first lens array 412 will be described later.

The second lens array 413 has substantially the same structure as the first lens array 412. In the second lens array 413, second lenses 4131 (small lenses respectively corresponding to the first lenses 4121) are arranged in a matrix form (see FIGS. 2 to 4). In cooperation with the superposing lens 415, the second lens array 413 combines images of the first lenses 4121 of the first lens array 412 on the image formation area of the below-described liquid crystal panel 441 of the electrooptical device 44.

Figure 4:
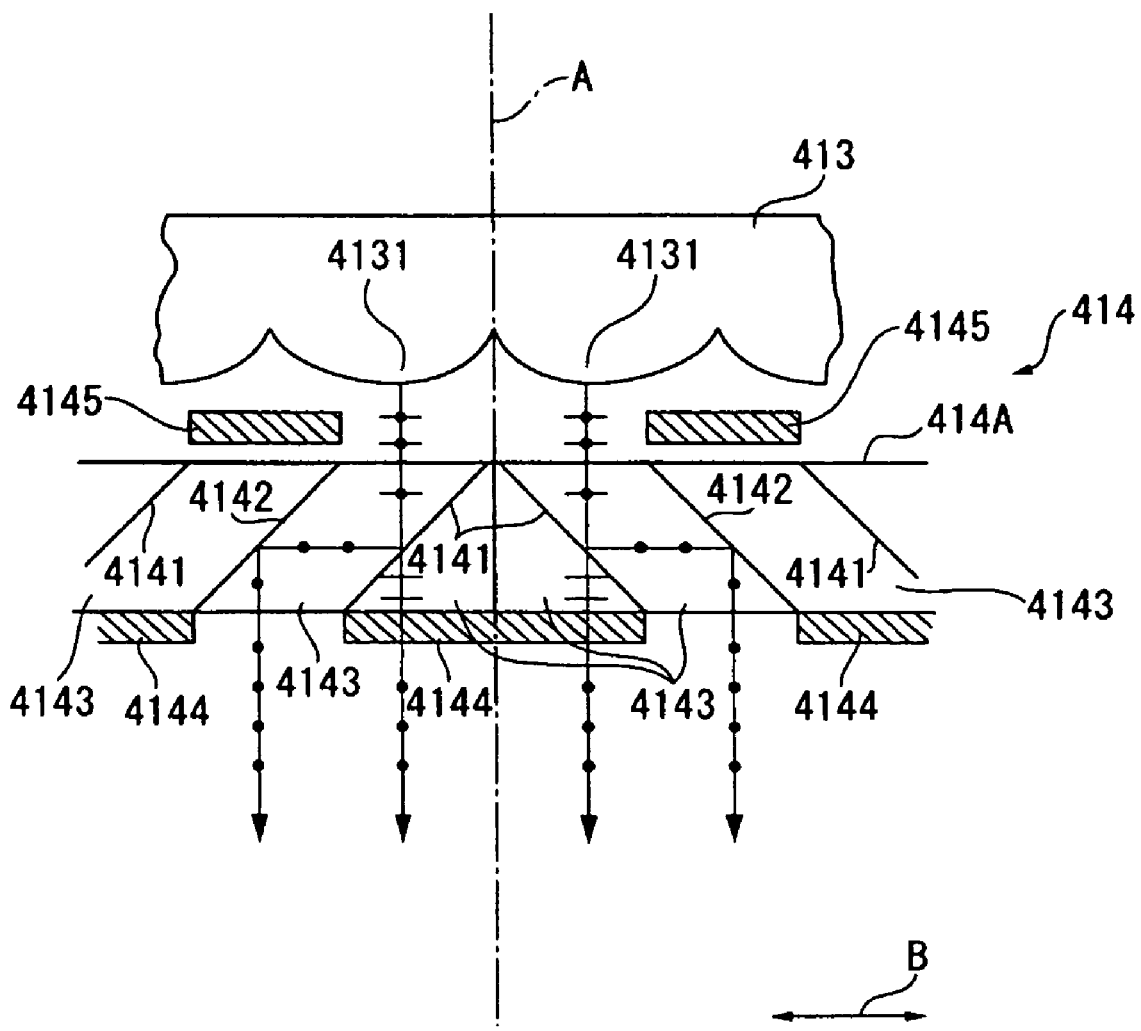
FIG. 4 is a schematic illustration showing a structure of a polarization converter of the first exemplary embodiment.

FIG. 4 is a partially enlarged cross section of the polarization converter 414.

As shown in FIG. 1, the polarization converter 414 is disposed between the second lens array 413 and the superposing lens 415. The polarization converter 414 aligns polarization directions of the plurality of partial light beams divided by the first lens array 412.

As shown in FIG. 4, the polarization converter 414 includes: polarization separating layers 4141 and reflection layers 4142 alternately arranged substantially with an inclination of 45 degrees relative to the illumination optical axis A; glass members 4143 on which the polarization separating layers 4141 and the reflection layers 4142 are formed; phase layers 4144 that convert polarization directions of incident light beams; and light shield plates 4145 that shield the incident light beams.

As shown in FIG. 4, the lengthwise directions of the polarization separating layers 4141 and the reflection layers 4142 are defined as a first direction (a vertical direction indicated by arrow C in FIG. 3), the first direction being in a plane orthogonal to the illumination optical axis A. The polarization separation layers 4141 and the reflection layers 4142 are alternately arranged in a second direction (which is a horizontal direction indicated by arrow B in FIGS. 2 and 4), the second direction being orthogonal to the illumination optical axis A and the first direction.

The partial light beams divided by the first lens array 412 are incident on the polarization separating layers 4141 through a light incident surface 414A at positions corresponding to the polarization separating layers 4141. In the polarization converter 414, the width of the light incident surface 414A in the first direction is substantially the same as the width of the polarization separating layers 4141 in the first direction (the width in the lengthwise direction of the polarization separating layers 4141). The width of the light incident surface 414A in the second direction is substantially the same as the width of the polarization separating layers 4141 in the second direction.

The polarization separating layer 4141 separates random polarized light beams into two types of liner polarized light beams. The polarization separating layer 4141 is a dielectric multi-layer film capable of transmitting one polarized light beam out of the incident light beams and reflecting the other polarized light beam.

The reflection layer 4142, which is a reflection film made of a single metal or an alloy, reflects the polarized light beam reflected by the polarization separating layer 4141 into the direction same as the polarized light beam having passed through the polarization separating layer 4141 toward the light beam emitting-side of the polarization converter 414.

The glass member 4143 transmits the light beam therethrough. The glass member 4143 is formed by machining a white glass sheet or the like in the first exemplary embodiment.

The phase layers 4144 are provided on the light beam emitting-side of the glass members 4143. The phase layer 4144 rotates the polarization direction of the light beam irradiated from the glass member 4143 by 90 degrees such that the rotated polarization direction aligns with the polarization direction of the other linear polarized light beam.

More specifically, the phase layer 4144 is affixed on the light beam emitting-side surface of the glass member 4143 at a position where the linear polarized light beam having passed through the polarization separating layer 4141 is irradiated. The phase layer 4144 rotates by 90 degrees the polarization direction of the linear polarized light beam having passed through the polarization separating layer 4141.

Note that the phase layer 4144 may be affixed on the light beam emitting-side surface of the glass member 4143 at a position where the linear polarized light beam reflected by the reflection layer 4142 is irradiated such that the phase layer 4144 can rotate by 90 degrees the polarization direction of the linear polarized light beam reflected by the reflection layer 4142.

The light shield plates 4145 are disposed on the light incident side of the glass members 4143. The light shield layers 4145 are made of stainless steel or an aluminum alloy and disposed at positions corresponding to the reflection layers 4142. Accordingly, the partial light beams irradiated from the first and second lens arrays 412, 413 are not directly incident on the reflection layers 4142 of the polarization converter 414.

Specifically, the partial light beams irradiated from the first and second lens arrays 412, 413 are incident only on the polarization separating layers 4141 and unnecessary light beams are shielded by the light shield plates 4145 so as not to be incident on the reflection layers 4142. Hence, most of the partial light beams irradiated from the second lens array 413 are incident on the light incident surface 414A on the light incident side of the glass members 4143 at positions not covered by the light shield plates 4145 and then on the polarization separating layers 4141 through the glass members 4143.

Next described with reference to FIG. 4 will be how the polarization separating layer 4141 of the polarization converter 414 transmits a P polarized light beam and reflects an S polarized light beam.

The partial light beam irradiated from the second lens 4131 of the second lens array 413 passes between the adjacent light shield plates 4145 to be incident on the light incident surface 414A of the polarization converter 414 and then on the polarization separating layer 4141 through the glass member 4143. The polarization separating layer 4141 transmits the P polarized light beam in the partial light beams and reflects the S polarized light beam toward the reflection layer 4142 by converting the optical path of the S polarized light beam by 90 degrees.

The S polarized light beam incident on the reflection layer 4142 is reflected by the reflection layer 4142 such that the optical path is converted by 90 degrees toward the light beam emitting-side, so that the S polarized light beam travels in the substantially same direction of the illumination optical axis A.

The P polarized light beam having passed the polarization separating layer 4141 is incident on the phase layer 4144. The polarization direction is rotated by 90 degrees by the phase layer 4144, so that the P polarized light beam is irradiated as the S polarized light beam. Thus, only substantially one type of light beam (i.e. the S polarized light beam) is irradiated from the polarization converter 414.

Note that in the case of the projector using the liquid crystal panel that modulates the linear polarized light beam, only uniform type of linear polarized light beams can be used, so that it is impossible to utilize substantially half of the light beams irradiated from the light source device 411 that emits random polarized light beams. Accordingly, the first exemplary embodiment employs the polarization converter 414 such that the light beams irradiated from the light source device 411 can be converted into substantially one type of liner polarized light beams, thereby enhancing light use efficiency of the electrooptical device 44.

Thus, the partial light beams converted into substantially one type of linear polarized light beams by the polarization converter 414 are superposed by the superposing lens 415 on the image formation area (an light modulating surface) of the later-described liquid crystal panel 441 of the electrooptical device 44.

As shown in FIG. 1, the color-separating optical device 42 is a color-separating optical system including two dichroic mirrors 421, 422 and a reflection mirror 423. The dichroic mirrors 421, 422 separate the plurality of partial light beams irradiated from the illumination optical device 41 into three color light beams of red (R), green (G) and blue (B).

The relay optical device 43 includes an incident-side lens 431, a relay lens 433 and reflection mirrors 432, 434. The relay optical device 43 guides the red light beam separated by the color-separating optical device 42 to a red liquid crystal panel 441R.

The dichroic mirror 421 of the color-separating optical device 42 transmits a red light component and a green light component of the light beam irradiated by the illumination optical device 41. The dichroic mirror 421 reflects a blue light component. The blue light beam reflected by the dichroic mirror 421 is also reflected by the reflection mirror 423 to travel through a field lens 419 to reach a blue liquid crystal panel 441B. The field lens 419 converts the partial light beams irradiated by the second lens array 413 into light beams parallel to the central axis (a main optical axis) of the field lens 419. The field lenses 419 provided on the light incident sides of a green liquid crystal panel 441G and the red liquid crystal panel 441R work in the same manner. The green light beam out of the red and green light beams having passed through the dichroic mirror 421 is reflected by the dichroic mirror 422 to travel through the field lens 419 to reach the green liquid crystal panel 441G. The red light beam passes through the dichroic minor 422, the relay optical device 43 and the field lens 419 to reach the red liquid crystal panel 441R. Note that the relay optical device 43 is employed for the red light beam to prevent a reduction in the light use efficiency caused by light dispersion or the like, since the optical path of the red light beam is longer than those of the light beams of the other colors. In other words, the relay optical device 43 is employed such that the partial light beams incident on the incident-side lens 431 can reach the field lens 419. Note that the relay optical device 43 is adapted to transmit the red light beam, but the arrangement is not limited thereto. The relay optical device 43 may transmit, for example, the blue light beam.

The electrooptical device 44 modulates the three color light beams irradiated from the color-separating optical device 42 in accordance with image information and combines the modulated color light beams into an optical image (a color image).

As shown in FIG. 1, the electrooptical device 44 includes the liquid crystal panels 441 as the optical modulators (the red, green and blue liquid crystal panels 441R, 441G and 441B), three incident-side polarization plates 442 respectively disposed on the light incident sides of the liquid crystal panels 441, three angle of view compensating plates 443 respectively disposed on the light beam emitting-sides of the liquid crystal panels 441, three emitting-side polarization plates 444 respectively disposed on the light beam emitting-sides of the angle of view compensating plates 443 and a cross dichroic prism 445 as the color-combining optical device.

Incident on the incident-side polarization plates 442 are the color light beams aligned in the substantially uniform polarization direction by the polarization converter 414. The incident-side polarization plate 442 transmits the polarized light beams out of the incident light beams, the polarized light beams being in the substantially same direction as the polarization direction of the light beams aligned by the polarization converter 414. The incident-side polarization plate 442 absorbs the other light beams. The incident-side polarization plate 442 may be a light-transmissive substrate with a polarization layer affixed thereon, the substrate being of sapphire glass, crystal or the like.

Although not shown in the figures, the liquid crystal panel 441 as the optical modulator is formed of a pair of light-transmissive glass substrates with a liquid crystal element (an electrooptic material) sealed therebetween. The orientation of the liquid crystal element in the liquid crystal panel 441 is controlled by a drive signal from the control device, so that the polarization direction of the polarized light beam irradiated from the incident-side polarization plate 442 is modulated.

The angle of view compensating plate 443 having a film-like shape compensates a phase difference between an ordinary light and an extraordinary light caused by a birefringence on the liquid crystal panel 441, the birefringence being generated when the light beam is obliquely incident on the liquid crystal panel 441 (i.e. when the light beam is incident obliquely relative to the normal line of the panel surface). The angle of view compensating plate 443 is a negatively uniaxial anisotropic body of which optical axis is oriented in a predetermined direction in the film plane and inclined in an out-plane direction of the film plane with a predetermined angle.

The angle of view compensating plate 443 may be formed by providing a discotic (disc like shaped) compound layer via an orientation layer on a light-transmissive support body made of for example triacetate (TAC). The angle of view compensating plate 443 may be a WV film available from FUJIFILM Corporation.

Out of the light beams irradiated from the liquid crystal panel 441 passed through the angle of view compensating plate 443, the emitting-side polarization plate 444 transmits the light beam having the polarization direction orthogonal to a transmissive axis of the light beam on the incident-side polarization plate 442 and absorbs the other light beams.

The cross dichroic prism 445 combines the modulated light that is irradiated from the emitting-side polarization plate 444 and modulated for each color to form an optical image (a color image). The cross dichroic prism 445 is square in plan view and is formed of four right-angle prisms attached together, two dielectric multi-layer films being formed on the boundaries of the right-angle prisms. The dielectric multi-layer films transmit the color light beam having passed through the emitting-side polarization plate 444 disposed on the opposite side of the projection lens 3 (on the green color side) and reflect the color light beams having passed through the other two emitting-side polarization plates 444 (the red and blue color sides). Thus, the color light beams modulated by the incident-side polarization plates 442, the liquid crystal panels 441, the angle of view compensating plates 443 and the emitting-side polarization plates 444 are combined into a color image.

3 Focal Position of First Lens 4121

As described above, the plurality of first lenses 4121 of the first lens array 412 divide the light beam irradiated from the light source device 411 into the plurality of partial light beams and irradiate the partial light beams to the corresponding second lenses 4131 of the second lens array 413. Toric lenses are employed as the first lenses 4121, so that a plurality of focal positions can be set in the second and first directions, the second direction being the horizontal direction in which the polarization separating layers 4141 and the reflection layers 4142 of the polarization converter 414 are aligned (arrow B in FIG. 2) and the first direction being the vertical direction (the lengthwise direction) of the polarization separating layers 4141 and the reflection layers 4142 of the polarization converter 414 (arrow C in FIGS. 3).

By employing the toric lens as the first lens 4121, it is possible not only to flexibly set the focal positions in the first and second directions but also to easily arrange the first lenses 4121.

As shown in FIG. 2, the focal position in the second direction of the first lens 4121 is set in the vicinity of the polarization converter 414 in the optical axis direction of the light beam irradiated from the first lens 4121. Specifically, the focal position in the second direction is set substantially at the center of the polarization separating layer 4141 of the polarization converter 414 on which the light beam is incident via the corresponding second lens 4131.

As shown in FIG. 3, the focal position in the first direction of the first lens 4121 is set in the vicinity of the second lens array 413 in the optical axis direction of the light beam irradiated from the first lens 4121. Specifically, the focal position in the first direction is set substantially at the center of the corresponding second lens 4131.

4 Optical Path of Light Irradiated from Light Source Device 416

4-1 Optical Path of First Comparison to First Exemplary Embodiment

A first comparison will be described, in which a focal position of a first lens 412A1 of a first lens array 412A is set in the vicinity of the second lens array 413.

Figure 5:
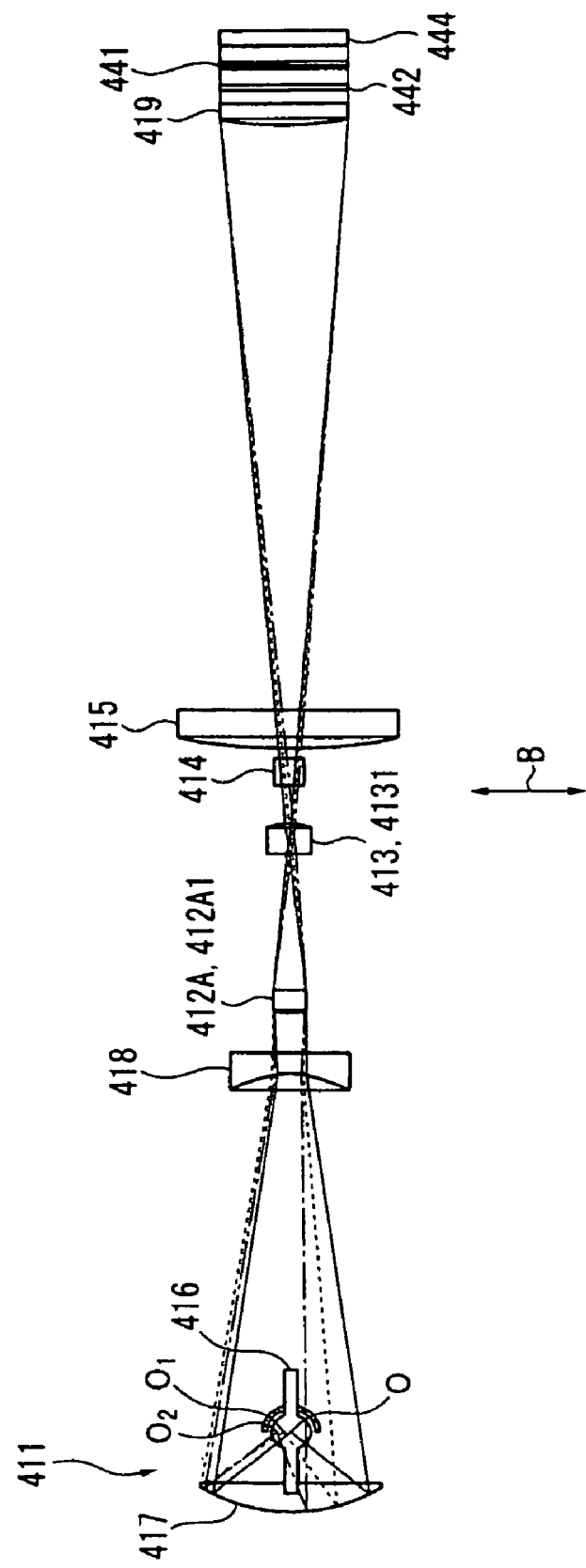
FIG. 5 is an illustration showing an optical path of a light beam in a second direction of a first comparison to the first exemplary embodiment.
Figure 6:
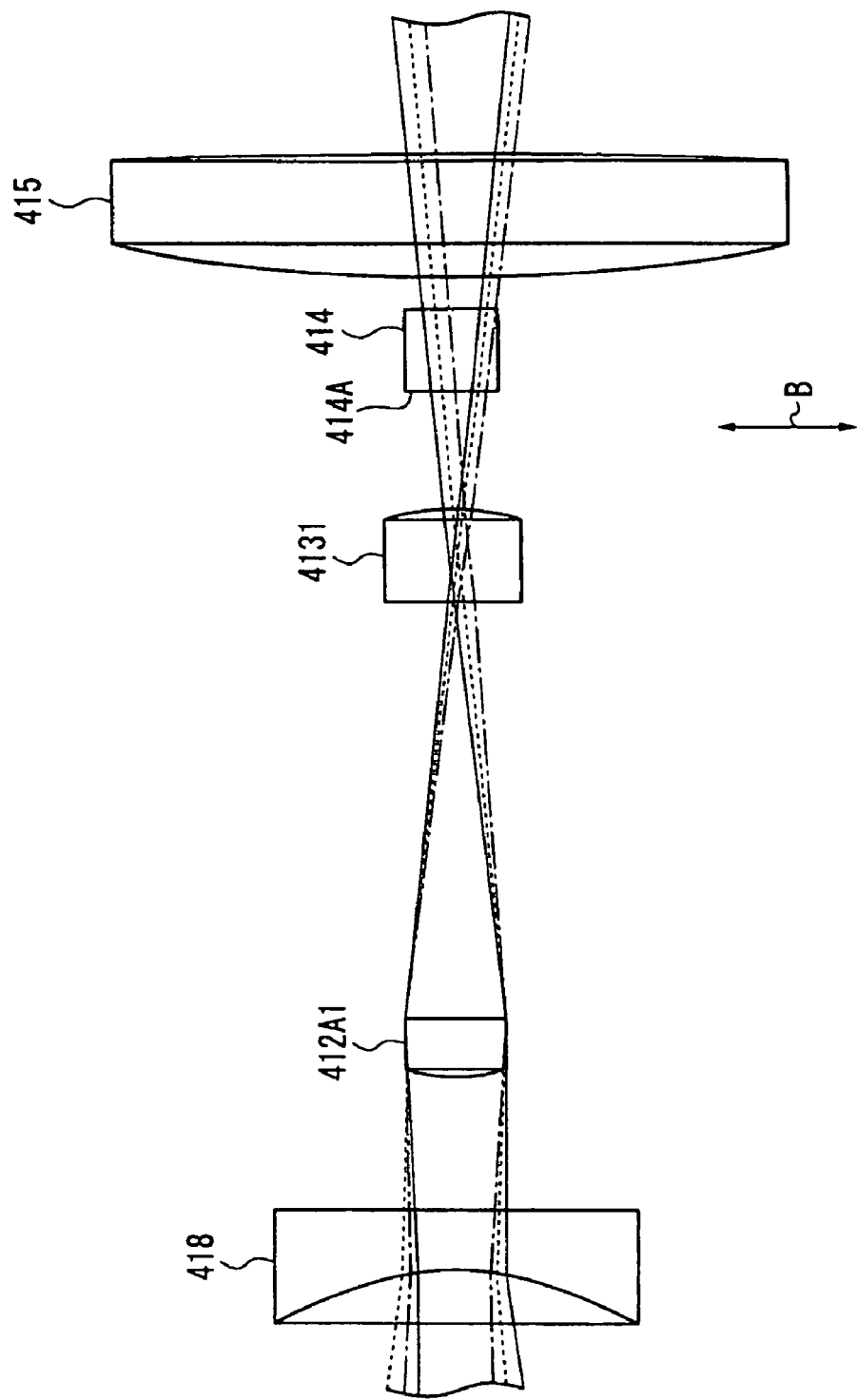
FIG. 6 is an illustration showing a portion of FIG. 5 in an enlarged manner.

FIG. 5 is a schematic illustration showing optical paths of light beams irradiated from the light source lamp 416 of the optical unit 4, the optical unit 4 including the first lens 412A1 of the first comparison. FIG. 6 is an illustration showing a portion of FIG. 5 in an enlarged manner. Note that the first lens array 412A is different from the first lens array 412 of the first exemplary embodiment in that the focal position in the second direction of the first lens 412A1 of the first lens array 412A is set in the vicinity of the second lens array 413. However, the first lens array 412A is the same as the first lens array 412 in that the first lens array 412A has the plurality of first lenses 412A1.

Note that FIGS. 5 and 6 contain no aberration in the illumination optical axis A direction for easy description. FIGS. 5 and 6 focus on one first lens 412A1 out of the plurality of first lenses 412A1 of the first lens array 412A and show a corresponding second lens 4131 and a corresponding portion of the polarization converter 414 both corresponding to the first lenses 412A1.

As shown in FIGS. 5 and 6, when the center O of the light emitting portion D of the light source lamp 416 is positioned substantially at the middle of the electrodes, incident on the first lens 412A1 of the first lens array 412A via the reflector 417 and the collimating lens 418 are the light (shown in the solid lines) irradiated from the center O of the light emitting portion D; the light (shown in the broken lines) irradiated from a position O1 on an outer side of the center O of the light emitting portion D, the position O1 being displaced in the second direction (arrow B in FIGS. 5 and 6) from the center O of the light emitting portion D toward the outer side of the center O; and the light (shown in the dashed lines) irradiated from a position O2 which is an outermost position on the outer side in the second direction of the light emitting portion D. The light irradiated from the light emitting portion D passes through the first lens 412A1 to be divided into partial light beams which further travel from the first lens 412A1 to the corresponding second lens 4131 of the second lens array 413. However, the more the light irradiation position is displaced from the center O of the light emitting portion D, the more the light incident position of the partial light beams on the second lens 4131 is displaced in the opposite direction of the displaced direction of the light irradiation position of the light from which the partial light beams are generated.

For example, the partial light beams generated from the light irradiated from the outermost position O2 displaced from the center O of the light emitting portion D in the second direction toward the outer side (shown in the dashed lines) are incident on the corresponding second lens 4131 at an incident position near one end of the corresponding second lens 4131 in the direction which extends from the light irradiation position to the center O of the light emitting portion D. Each light incident on the second lens 4131 is then incident on the light incident surface 414A of the polarization converter 414. Since the focal position in the second direction of the first lens 4121 is set in the vicinity of the second lens array 413, the light beam irradiated from the second lens 4131 travels in an expanding manner to be incident on the light incident surface 414A in a large illumination region.

However, when the center O of the light emitting portion D is positioned substantially at the middle of the electrodes 4164, 4165, substantially all the light of the partial light beams generated from the light irradiated from the center of the light emitting portion D and substantially all the light of the partial light beams generated from the light irradiated from the outermost position in the second direction of the light emitting portion D are both incident on the light incident surface 414A of the polarization converter 414. The same applies to all first lenses 412A1 and the partial light beams from the first lenses 412A1 are superposed on the image formation area of the liquid crystal panel 441. Thus, the image formation area of the liquid crystal panel 441 is illuminated with uniform luminance.

Next described will be the first comparison in which the light emitting portion D of the light source lamp 416 is moved in the second direction (arrow B).

When the light emitting portion D of the light source lamp 416 is moved in the second direction (arrow B) substantially from the middle of the electrodes 4164, 4165, the partial light beams generated by the first lens 412A1 to be incident on the corresponding second lens 4131 are generally incident on the second lens 4131 with the displacement in the opposite direction of the movement direction of the light emitting portion D as described above and then incident on the light incident surface 414A of the polarization converter 414 with a similar displacement toward the opposite direction of the movement direction.

For example, when the light emitting portion D is moved upward in FIG. 5 (one side of arrow B in FIG. 5), the light beam irradiated from the first lens 412A1 is incident on the corresponding second lens 4131 at a position displaced toward the end on the lower side in FIG. 5 (the other side of arrow B in FIG. 5) and then incident on the light incident surface 414A also at a position displaced toward the end on the lower side.

Accordingly, the more the light emitting portion D is moved in the second direction, the more difficult for the partial light beams irradiated from the first lens 412A1 to be incident on the light incident surface 414A as the light irradiation position of the light from which the partial light beams are generated becomes farther from the center O of the light emitting portion D in the movement direction of the light emitting portion D.

More specifically, when the position of the light emitting portion D is moved upward in FIG. 5, the partial light beams generated from the light irradiated form the moved light emitting portion D are incident on the corresponding second lens 4131 with a larger displacement in the opposite direction of the movement direction of the light emitting portion D, compared with the case in which the center O of the light emitting portion D is substantially at the middle of the electrodes. The same applies to the light incident on the light incident surface 414A of the polarization converter 414. As shown in FIGS. 5 and 6, the focal position of the first lens 412A1 of the first comparison is set in the vicinity of the second lens 4131, so that the partial light beams irradiated form the first lens 412A1 are converged in the vicinity of the second lens 4131 and expand in the vicinity of the light incident surface 414A of the polarization converter 414 to be incident thereon. Hence, the illumination region of the partial light beams incident on the light incident surface 414A of the polarization converter 414 becomes large.

Accordingly, when the light emitting portion D is moved in the second direction by a predetermined distance, substantially all the partial light beams generated from the light irradiated from the center O of the light emitting portion D out of the light irradiated from the light emitting portion D are incident on the light incident surface 414A of the polarization converter 414. However, in the case of the partial light beams generated from the light irradiated from an end position in the movement direction of the light emitting portion D, the light of the partial light beams is partially out of the light incident surface 414A of the polarization converter 414 at an end on the opposite side of the end position in the movement direction of the light emitting portion D to be incident on the light shield plate 4145.

When the light emitting portion D is further moved in the second direction by a larger distance than the predetermined distance, not only the light of the partial light beams generated from the light irradiated from the end position in the movement direction of the light emitting portion D but also the light of the partial light beams generated from the light irradiated from a position closer to the center O compared to the end position in the movement direction are partially out of the light incident surface 414A of the polarization converter 414 to be incident on the light shield plate 4145.

That is, when the light emitting portion D is moved in the second direction by a certain distance, the partial light beams are partially out of the light incident surface 414A of the polarization converter 414 to be incident on the light shield plate 4145 regardless of the irradiation position of the light in the light emitting portion D. In the light emitting portion D moved in the second direction by a certain distance, when comparing the ratios of the light incident on the light shield plate 4145 to the total light of the partial light beams between the partial light beams generated from the light irradiated from the center O of the light emitting portion D and the partial light beams generated from the light irradiated from a position displaced in the movement direction from the center O of the light emitting portion D, the latter case represents a higher ratio. That is to say, the partial light beams generated from the light irradiated from a position apart from the light emitting portion D are incident on the light shield plate 4145 at a higher rate.

4-2 Luminance Distribution in Liquid Crystal Panel 441 of First Comparison

Figure 7:
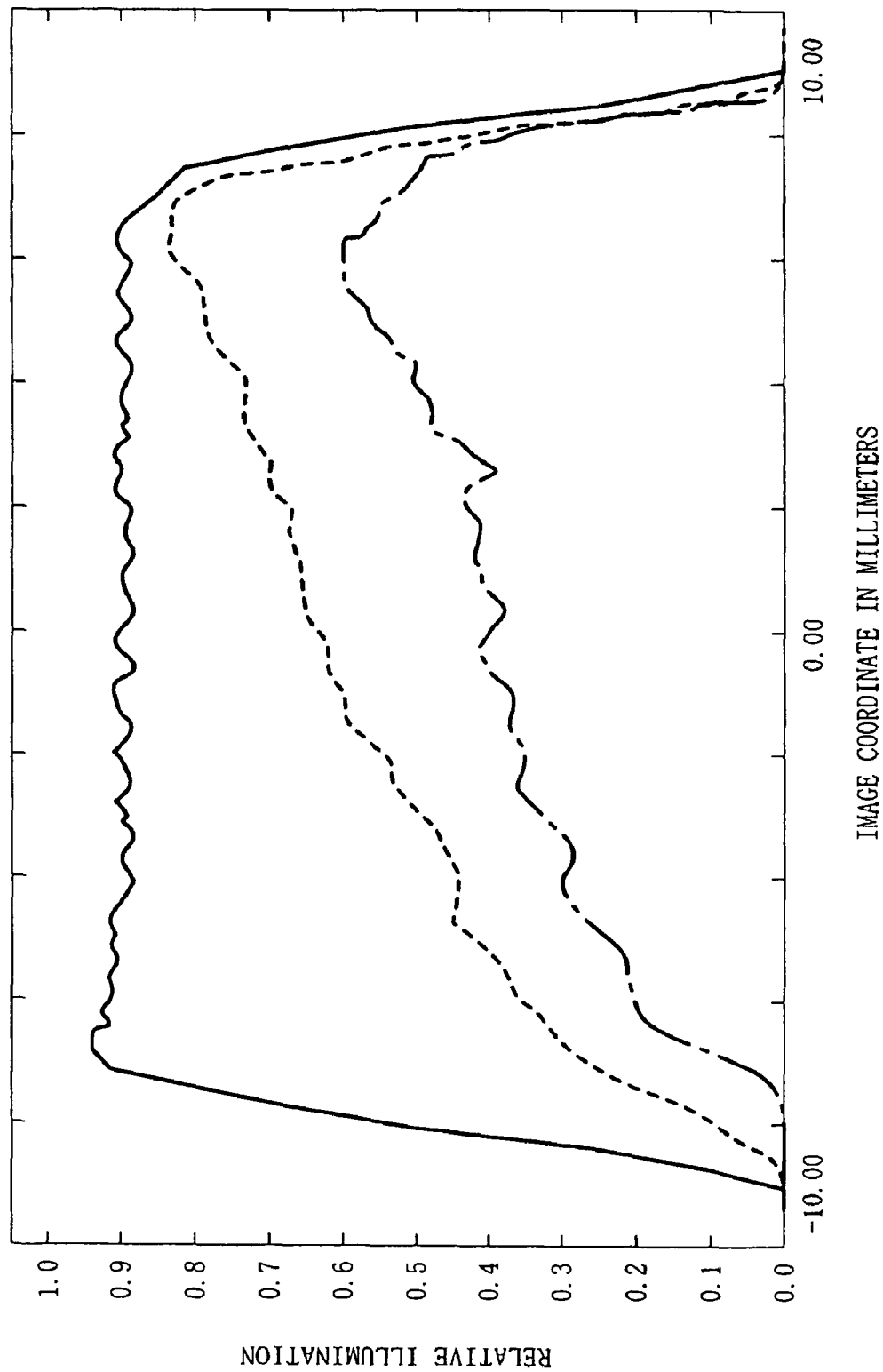
FIG. 7 is a graph showing a relation between a movement amount in the second direction of a light emitting portion and luminance distribution on a liquid crystal panel of the first comparison to the first exemplary embodiment.

FIG. 7 shows a relation between the movement amount in the second direction of the light emitting portion D and luminance distribution in the first comparison. Specifically, in FIG. 7, the solid line shows the luminance distribution on the liquid crystal panel 441 when the center O of the light emitting portion D is substantially at the middle of the electrodes. The broken line shows the luminance distribution on the liquid crystal panel 441 when the center O of the light emitting portion D is moved in the second direction substantially from the middle of the electrodes. The dashed line shows the luminance distribution on the liquid crystal panel 441 when the center of the light emitting portion D is moved in the second direction substantially from the middle of the electrodes by a longer distance than the case of the broken line.

As described above, when the light emitting portion D is moved in the second direction by a certain distance substantially from the middle of the electrodes 4164, 4165, the partial light beams generated from the light irradiated from different positions in the light emitting portion D are partially out of the light incident surface 414A of the polarization converter 414 and incident on the light shield plate 4145. In other words, when the center O of the light emitting portion D is moved in the second direction by a certain distance, the partial light beams generated from the light irradiated from the light emitting portion D illuminate the image formation area of the liquid crystal panel 441 with portion thereof reduced, the reduced portion being incident on the light shield plate 4145 of the polarization converter 414, although the ratios of the light to be incident on the light incident surface 414A to the light to be incident on the light shield plate 4145 depend on the irradiation position of the light in the light emitting portion D from which the partial light beams are generated.

For example, the partial light beams generated from the light irradiated from the center O of the light emitting portion D illuminate the image formation area of the liquid crystal panel 441 with portion thereof reduced on one end side by the light shield plate 4145 and the partial light beams generated from the light irradiated from a position displaced in the movement direction of the light emitting portion D from the center O of the light emitting portion D illuminate the image formation area of the liquid crystal panel 441 with portion thereof reduced on the one end side by the light shield plate 4145.

Thus, even if the partial light beams with portion thereof reduced by the light shield plate 4145 on the one end side are superposed on the image formation area of the liquid crystal panel 441, it is impossible to illuminate the image formation area with uniform luminance. Accordingly, as shown in the broken and dashed lines in FIG. 7, one end side of the image formation area is illuminated with higher luminance than the other end side.

When thus superposed light beams are modulated by the liquid crystal panels 441 to form an image in accordance with the color light beams, the image will have higher brightness on one end side in the second direction (the horizontal direction) than on the other end side. Note that the light beams superposed on the image formation areas of the liquid crystal panels 441 have been reflected by the mirrors of the color-separating optical device 42 and the relay optical device 43. In addition, the red and blue light beams have been reflected by the cross dichroic prism 445 that combine the color light beams as images. Hence, in the optical image formed by the cross dichroic prism 445 by combining the color light beams, the color images of red, green and blue have the higher brightness on different sides, thereby causing color unevenness.

4-3 Second Comparison to First Exemplary Embodiment

Next described will be a second comparison in which the light emitting portion D of the light source lamp 416 is moved in the first direction.

In the second comparison, the focal position in the first direction (the vertical direction) of the first lens of the first lens array is set in the vicinity of the light incident surface 414A of the corresponding polarization converter 414.

In the second comparison, when the center O of the light emitting portion D is positioned substantially at the middle of the electrodes 4164, 4165, the light irradiated from the center O of the light emitting portion D is incident substantially on the center of the corresponding second lens 4131 via the first lens as described above. The light irradiated from an outer position in the first direction of the light emitting portion D is incident via the first lens on the corresponding second lens 4131 on the end displaced in the opposite direction of the movement direction in which the light irradiation position is moved from the center O of the light emitting portion D. When the focal position in the first direction of the first lens is set in the vicinity of the light incident surface 414A of the polarization converter 414, the light irradiated from the first lens is incident on the second lens 4131 in a large illumination region before light convergence on the focal position. However, when the center O of the light emitting portion D is positioned substantially at the middle of the electrodes 4164, 4165, substantially all the light of the partial light beams generated from the light irradiated from the center in the first direction of the light emitting portion D and substantially all the light of the partial light beams generated from the light irradiated from the outermost position in the first direction are both incident on the second lens 4131. The same applies to all first lenses 412A1 and the partial light beams are superposed on the image formation areas of the liquid crystal panels 441. Accordingly, the image formation area of the liquid crystal panel 441 is illuminated with uniform luminance.

However, although not shown in the figures, also in the second comparison, when the position of the light emitting portion D of the light source lamp 416 is moved in the first direction (the vertical direction) substantially from the middle of the electrodes 4164, 4165, luminance unevenness occurs in the image formation area of the liquid crystal panel 441 in a similar manner to the first comparison, thereby causing color unevenness in the formed optical image.

Specifically, when the light emitting portion D of the light source lamp 416 is moved in the first direction, the partial light beams to be incident on the second lens 4131 via the first lens are generally incident on the corresponding second lens 4131 with displacement toward the direction opposite to the movement direction of the light emitting portion D. Hence, the more the light emitting portion D is moved in the first direction such that the light irradiation position of the light becomes farther from the center O of the light emitting portion D in the movement direction of the light emitting portion D, the more difficult for the partial light beam irradiated from the first lens to be incident on the second lens 4131.

That is, since the focal position in the first direction of the first lens in the second comparison is set in the vicinity of the light incident surface 414A of the corresponding polarization converter 414, the partial light beams irradiated from the first lens enter the second lens 4131 while converging in the vicinity of the second lens 4131 and converge at maximum in the vicinity of the light incident surface 414A of the polarization converter 414.

Hence, the illumination region is large when the partial light beams are incident on the second lens 4131. When the light emitting portion D is moved in the first direction by a predetermined distance, substantially all the partial light beams generated from the light irradiated from the center O of the light emitting portion D are incident on the corresponding second lens 4131. In the case of the partial light beams generated from the light irradiated from the end position in the movement direction of the light emitting portion D in the light emitting portion D, the light of the partial light beams on the end displaced in the direction opposite to the movement direction of the light emitting portion D is partially out of the corresponding second lens 4131 and incident on another second lens 4131 which is next to the corresponding second lens 4131 in the first direction.

When the light emitting portion D is moved in the first direction by a larger distance than the predetermined distance, not only the light of the partial light beams generated from the light irradiated from the end position in the movement direction of the light emitting portion D but also the light of the partial light beams generated from the light irradiated from a position closer to the center O of the light emitting portion D compared to the end in the movement direction are partially out of the second lens 4131 to be incident on the other second lens 4131.

That is, when the light emitting portion D is moved in the first direction by a certain distance, the light of the partial light beams generated from the light irradiated from different positions of the light emitting portion D is always partially incident on the other second lens 4131 next to the corresponding second lens 4131. In the light emitting portion D at a position displaced in the first direction, when comparing the ratios of the light to be incident on the second lens 4131 between the partial light beams generated from the light irradiated from the center O of the light emitting portion D and the partial light beams generated from the light irradiated from positions displaced in the movement direction from the center O of the light emitting portion D, the latter case represents a larger ratio, in which the partial light beams are generated from the light irradiated from a position displaced from the light emitting portion D.

The partial light beams incident on the next second lens 4131 are not superposed on the image formation area of the liquid crystal panel 441. That is, similarly to the above-described first comparison, even if the partially-reduced partial light beams are superposed on the image formation area of the liquid crystal panel 441 (the partial reduction being caused by that the light on one side of the light emitting portion D is not incident on the corresponding second lens 4131), it is impossible to illuminate the image formation area with uniform luminance. Accordingly, the image formation area is illuminated with higher luminance on the other end side than on the one end side, thereby causing luminance unevenness in the image formation area. Further, if such light beams are modulated during the transmission through the image formation area and the modulated light beams are combined by the cross dichroic prism 445, the formed optical image will contain color unevenness as described above, 4-4 Optical Path of First Exemplary Embodiment Next described will be the first lens 4121 of the first exemplary embodiment, of which focal position in the second direction (the horizontal direction, arrow B in FIG. 8) is set in the vicinity of the corresponding polarization separating layer 4141 and focal position in the first direction (the vertical direction, arrow C in FIG. 3) is set in the vicinity of the corresponding second lens 4131.

Figure 8:
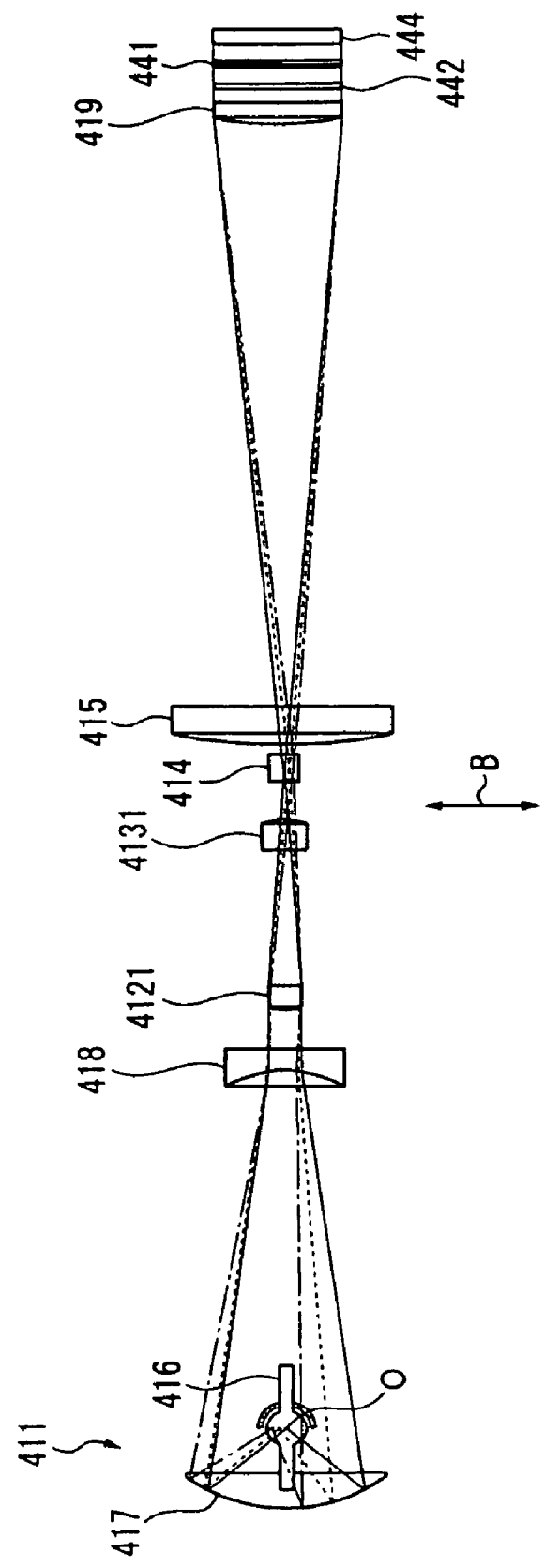
FIG. 8 is an illustration showing an optical path of a light beam in the second direction of the first exemplary embodiment.
Figure 9:
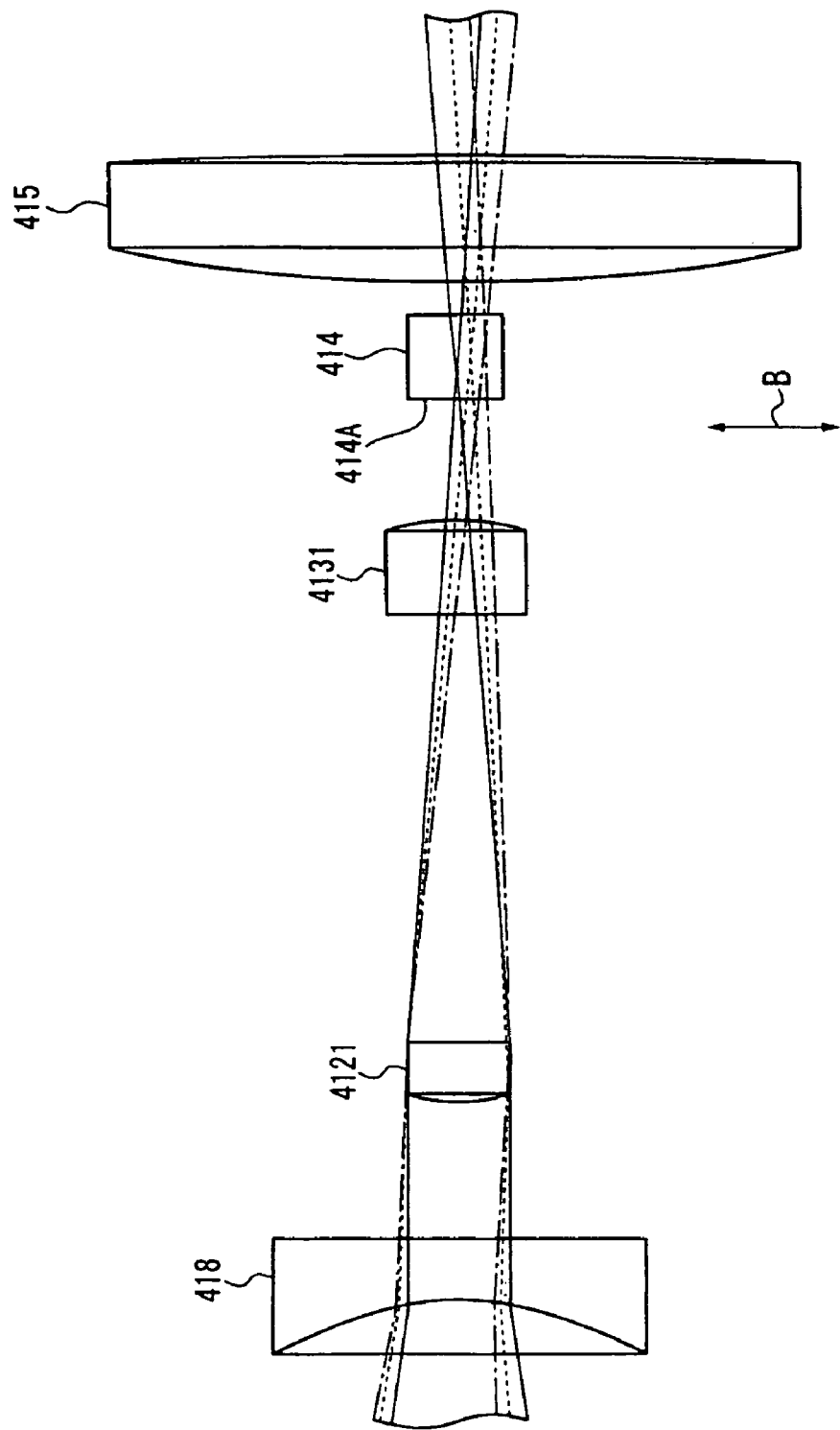
FIG. 9 is an illustration showing a portion of FIG. 8 in an enlarged manner.

FIG. 8 is an illustration showing an optical path of a light beam irradiated from the light source lamp 416 of the optical unit 4 of the first exemplary embodiment, the optical unit 4 including the first lens 4121 of which focal position in the second direction is set in the vicinity of the polarization converter 414. FIG. 9 is an illustration showing a portion of FIG. 8 in an enlarged manner. FIGS. 8 and 9 include no aberration in the illumination optical axis A direction for easy description. FIGS. 8 and 9 focus on one first lens 4121 out of the plurality of first lenses 4121 of the first lens array 412 and show a corresponding second lens 4131 and a corresponding portion of the polarization converter 414 both corresponding to the first lenses 4121.

However, in the first lens 4121 of the first exemplary embodiment, when the center O of the light emitting portion D is positioned substantially at the middle of the electrodes 4164, 4165, substantially all the light of the partial light beams generated from the light irradiated from the center in the second direction of the light emitting portion D and substantially all the light of the partial light beams generated from the light irradiated from the outermost position in the second direction are both incident on the light incident surface 414A of the polarization converter 414. The same applies to all first lenses 4121 of the first lens array 412. The image formation area of the liquid crystal panel 441 is illuminated with uniform luminance with the partial light beams irradiated from the first lens 4121.

Next described will be the case in which the light emitting portion D of the light source lamp 416 is moved in the second direction (the horizontal direction, arrow B in FIGS. 8 and 9) substantially from the middle of the electrodes 4164, 4165.

When the light emitting portion D of the light source lamp 416 is moved in the second direction (the horizontal direction), the partial light beams travel through the first lens 4121 and enter the corresponding second lens 4131 with the above-described displacement in the opposite direction of the movement of the light emitting portion D and then enter the light incident surface 414A of the polarization converter 414 with the same displacement in the opposite direction.

In contrast to the above-described first comparison, the focal position in the second direction of the first lenses 4121 of the first exemplary embodiment is set in the vicinity of the polarization converter 414 on the optical axes of the partial light beams (the central axes of the partial light beams) irradiated from the first lenses 4121, so that the partial light beams irradiated from the light source lamp 416 via the first lenses 4121 are most highly converged in the vicinity of the light incident surface 414A of the polarization converter 414 as shown in FIGS. 8 and 9, thereby reducing the size of the illumination region of the partial light beams on the light incident surface 414A of the polarization converter 414.

Hence, in the polarization converter 414, the illumination region of the incident partial light beams is small, so that when the light emitting portion D is moved in the second direction by a predetermined distance, substantially all the light of the partial light beams generated from the light irradiated from the center O of the light emitting portion D is incident on the light incident surface 414A of the polarization converter 414. In contrast, substantially all the light of the partial light beams generated from the light irradiated from a position in the vicinity of the end in the movement direction of the light emitting portion D is out of the light incident surface 414A of the polarization converter 414 and incident on the light shield plate 4145.

When the light emitting portion D is moved in the second direction by a larger distance than the predetermined distance, not only substantially all the light of the partial light beams generated from the light irradiated from end positions in the movement direction of the light emitting portion D but also substantially all the light of the partial light beams generated from the light irradiated from a position closer to the center O compared to the end in the movement direction are out of the light incident surface 414A of the polarization converter 414 and incident on the light shield plate 4145. That is, when the light emitting portion D is moved in the second direction by a certain distance, substantially all the light of some partial light beams out of the partial light beams generated from the light irradiated from different positions of the light emitting portion D is out of the light incident surface 414A of the polarization converter 414 and incident on the light shield plate 4145. The more the light emitting portion D is moved in the second direction, the larger an area in the light emitting portion D becomes, from the area the light of the partial light beams to be out of the light incident surface 414A of the polarization converter 414 and incident on the light shield plate 4145 being irradiated.

Hence, the first exemplary embodiment is different from the first comparison in which each light of the partial light beams generated from the light irradiated from different positions of the light emitting portion D is partially out of the light incident surface 414A of the polarization converter 414. The first exemplary embodiment differs from the first compassion in that substantially all the light of some partial light beams out of the partial light beams generated from the light irradiated from different positions in the light emitting portion D is out of the light incident surface 414A of the polarization converter 414 and incident on the light shield plate 4145.

Note that the focal position in the second direction of the first lenses 4121 is set in the vicinity of the polarization converter 414 on the optical axes of the partial light beams irradiated from the first lenses 4121. Since the partial light beams to be incident on the second lens 4131 are just before the maximum convergence, the illumination region of the partial light beams is large. However, the width in the second direction of the second lens 4131 is larger than the width in the second direction of the light incident surface 414A of the polarization converter 414. Accordingly, even when the light emitting portion D is moved in the second direction by a certain distance, it will not happen that the light of the partial light beams is partially out of the corresponding second lens 4131 before being shielded by the light shield plate 4145 of the polarization converter 414.

Figure 10:
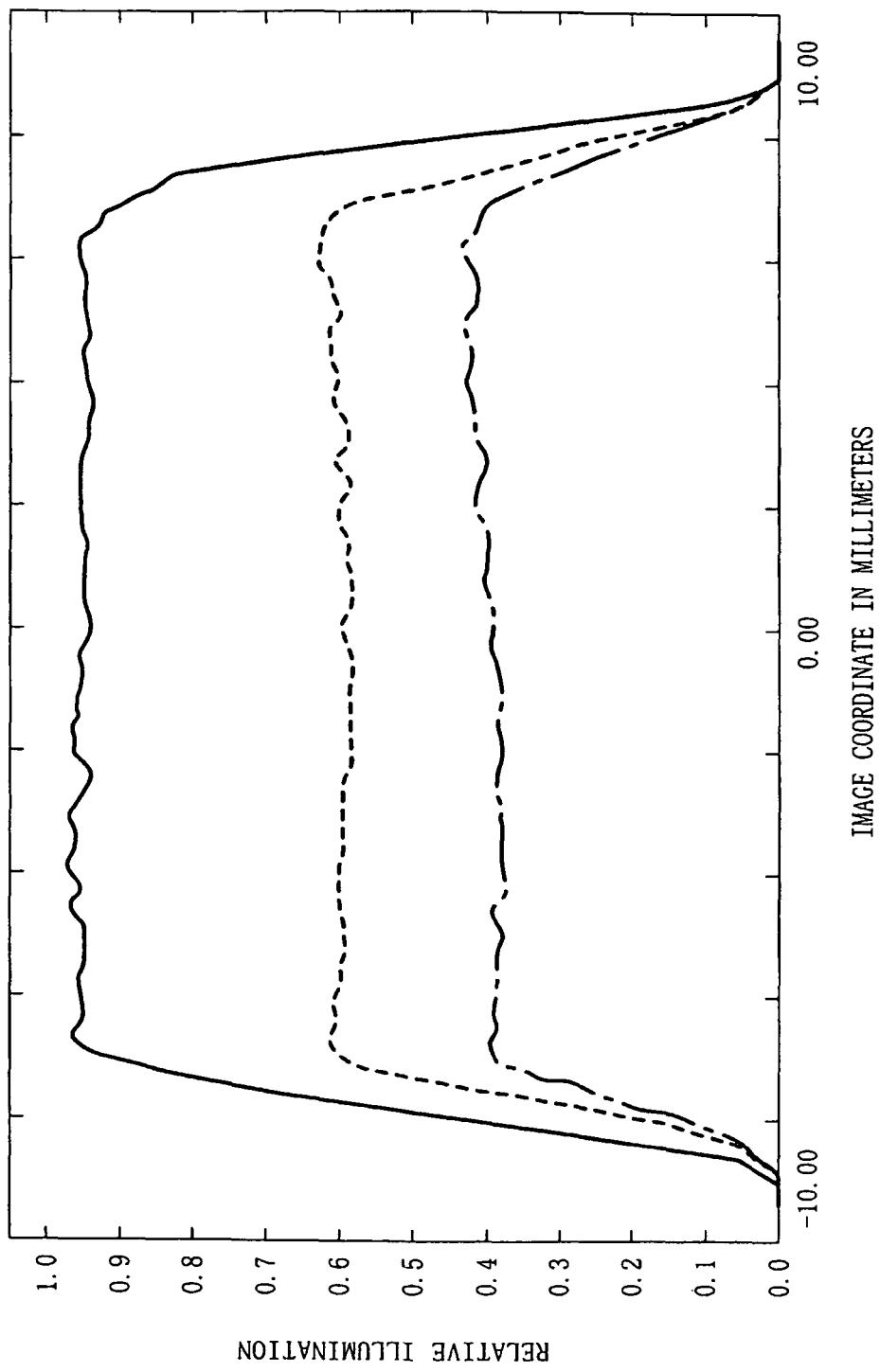
FIG. 10 is a graph showing a relation between a movement amount in the second direction of a light emitting portion and luminance distribution on a liquid crystal panel of the first exemplary embodiment.

4-5 Luminance Distribution on Liquid Crystal Panel 441 of First Exemplary Embodiment FIG. 10 shows a relation between a movement amount in the second direction of the light emitting portion D and luminance distribution on the liquid crystal panel 441 of the first exemplary embodiment. Specifically, in FIG. 10, the solid line shows the luminance distribution on the liquid crystal panel 441 when the light emitting portion D is substantially at the middle of the electrodes 4164, 4165. The broken line shows the luminance distribution on the liquid crystal panel 441 when the light emitting portion D is moved in the second direction substantially from the middle of the electrodes 4164, 4165. The dashed line shows the luminance distribution on the liquid crystal panel 441 when the light emitting portion D is moved in the second direction from the position of the light emitting portion D of the broken line.

As described above, when the light emitting portion D is moved in the second direction by a certain distance, substantially all the light of some partial light beams of the partial light beams generated from the light irradiated from each position of the light emitting portion D is out of the light incident surface 414A of the polarization converter 414 and is incident on the light shield plate 4145.

That is, in the case of the partial light beams generated from the light irradiated from the center O of the light emitting portion D, substantially all the light illuminates the image formation area of the liquid crystal panel 441. In contrast, in the case of the partial light beams generated from the light irradiated from a position displaced in the movement direction of the light emitting portion D to be apart from the center O of the light emitting portion D, substantially all the light is shielded by the light shield plate 4145 so as not to illuminate the image formation area of the liquid crystal panel 441.

Thus, in the first exemplary embodiment when the light emitting portion

D is moved in the second direction substantially from the middle of the electrodes 4164, 4165, although an area in the light emitting portion D from which the light to be divided into the partial light beams superposed on the image formation area of the liquid crystal panel 441 is small, substantially all the light of the partial light beams generated from the light irradiated from the other area in the light emitting portion D is superposed on the image formation area of the liquid crystal panel 441. Accordingly, the luminance on the image formation area of the liquid crystal panel 441 is lowered, but the luminance can be uniform on the image formation area.

As stated above, the arrangement of the first exemplary embodiment reduces a difference in the luminance between one end and the other end in the second direction when the partial light beams generated from each light irradiated from the light emitting portion D are superposed on the image formation area of the liquid crystal panel 441, thereby reducing luminance unevenness on the image formation area.

Even when the light emitting portion D of the light source lamp 416 is moved in the second direction, substantially uniformly illuminating the image formation area of the liquid crystal panel 441 reduces color unevenness of the optical image formed by combing the color light beams of red (R), green (G) and blue (B) having passed through the image formation areas by the cross dichroic prism 445.

On the other hand, the focal position in the first direction (the vertical direction) of the first lens 4121 of the first lens array 412 is set in the vicinity of the second lens array 413 on the optical axis of the light beam irradiated from the first lens 4121. Hence, even when the light emitting portion D of the light source lamp 416 is moved in the first direction (the vertical direction), the luminance unevenness on the image formation area of the liquid crystal panel 441 can be reduced, thereby reducing the color unevenness in the formed image.

The more detailed description will be given below.

When the light emitting portion D of the light source lamp 416 is moved in the first direction substantially from the middle of the electrodes 4164, 4165, the partial light beam to be incident on the corresponding second lens 4131 via the first lens 4121 is incident on the corresponding second lens 4131 with displacement toward the direction opposite to the movement direction of the light emitting portion D.

Accordingly, the more the light emitting portion D is moved in the first direction such that the light irradiation position becomes farther from the center O of the light emitting portion D in the movement direction of the light emitting portion D, the more difficult for the partial light beam irradiated from the first lens 4121 to be incident on the second lens 4131.

In the first exemplary embodiment, since the focal position in the first direction (the vertical direction) of the first lens 4121 is set in the vicinity of the second lens 4131 on the optical axis of the partial light beam irradiated from the first lens 4121, the partial light beam irradiated from the first lens 4121 is incident on the corresponding second lens 4131 in a small illumination region.

Hence, when the light emitting portion D is moved in the first direction by a predetermined distance, substantially all the light of the partial light beams generated from the light irradiated from the center O of the light emitting portion D is incident on the corresponding second lens 4131. On the other hand, substantially all the light of the partial light beams generated from the light irradiated from an end position of the light emitting portion D in the movement direction is out of the corresponding second lens 4131 and incident on the other second lens 4131 next to the corresponding second lens 4131 in the first direction.

When the light emitting portion D is moved in the first direction by a larger distance more than the predetermined distance, not only substantially all the light of the partial light beams generated from the light irradiated from the end position in the movement direction of the light emitting portion D in the light emitting portion D, but also substantially all the light of the partial light beams generated from the light irradiated from a position more closer to the center O than to the end in the movement direction is incident on the other second lens 4131 next to the corresponding second lens 4131 in the first direction.

That is, when the light emitting portion D is moved in the first direction by a certain distance, regardless of the irradiation position in the light emitting portion D, substantially all the light of some partial light beams from a position in the light emitting portion D is out of the corresponding second lens 4131 and incident on the other second lens 4131 next to the corresponding second lens 4131 in the first direction. The more the light emitting portion D is moved in the first direction, the larger the region becomes from which the light to be divided into the partial light beams to be out of the corresponding second lens 4131 and incident on the other second lens 4131 that is next to the corresponding second lens 4131 in the first direction is irradiated.

Hence, in the first exemplary embodiment, similarly to the above-described second comparison, the light of each partial light beam generated from the light irradiated from the different positions in the light emitting portion D is partially out of the corresponding second lens 4131 to be incident on the other second lens 4131 next to the corresponding second lens in the first direction, but substantially all the light of some partial light beams out of the total partial light beams is out of the corresponding second lens 4131 and incident on the other second lens 4131 next to the corresponding second lens 4131 in the first direction.

Note that since the focal position in the first direction of the first lens 4121 is set in the vicinity of the corresponding second lens 4131 on the optical axis of the partial light beam irradiated from the first lens 4121, the partial light beam incident on the light incident surface 414A of the polarization converter 414 gradually expands such that the illumination region becomes larger. However, the width of the light incident surface 414A of the polarization converter 414 in the first direction is wider than that of the second lens 4131 in the first direction. Accordingly, even when the light emitting portion D is moved in the first direction by a certain distance, a case will not occur in which the light of some partial light beams out of the partial light beams is not incident on the light incident surface 414A of the polarization converter 414 before the partial light beams enter the light incident surface 414A of the polarization converter 414.

As described above, when the light emitting portion D is moved in the first direction substantially from the middle of the electrodes 4164, 4165 by a certain distance, substantially all the light of some partial light beams out of the partial light beams generated from the light irradiated from different positions in the light emitting portion D is out of the corresponding second lens 4131 and incident on the other second lens 4131 next to the corresponding second lens 4131 in the first direction. The light incident on the next second lens 4131 is not superposed on the image formation area as stated above.

That is, in the case of the partial light beams generated from the light irradiated from the center O of the light emitting portion D, substantially all the light of the partial light beams illuminates the image formation area of the liquid crystal panel 441. On the other hand, in the case of the partial light beams generated from the light irradiated from a position displaced in the movement direction of the light emitting portion D to be apart from the center O of the light emitting portion D, substantially all the light of the partial light beams is incident on the other second lens 4131 next to the corresponding second lens 4131 so as not to illuminate the image formation area of the liquid crystal panel 441.

Thus, in the first exemplary embodiment when the light emitting portion D is moved in the first direction, although an area from which the light to be divided into the partial light beams superposed on the image formation area of the liquid crystal panel 441 is small, substantially all the light of the partial light beams generated from the light irradiated from the other area in the light emitting portion D is superposed on the image formation area of the liquid crystal panel 441. Hence, the illumination intensity on the image formation area is lowered as a whole, but the illumination intensity can be uniform on the image formation area. Accordingly, luminance unevenness is reduced on the image formation area of the liquid crystal panel 441.

Even when the light emitting portion D is moved in the first direction, uniformly illuminating the image formation area of the liquid crystal panel 441 reduces color unevenness of the optical image formed by combing the color images of red (R), green (G) and blue (B) on the image formation areas by the cross dichroic prism 445.

The projector of the first exemplary embodiment provides advantages below.

The focal position in the second direction (the horizontal direction) of the first lens 4121 of the first lens array 412 is set in the vicinity of the polarization converter 414 on the optical axis of the light beam irradiated from the first lens 4121.

Accordingly, when the light emitting portion D of the light source lamp 416 is moved in the second direction, the light irradiation position in the light emitting portion D determines whether the partial light beams generated from the light passing through the first lens 4121 are incident on the light incident surface 414A of the polarization converter 414. In other words, when the partial light beams generated from the light irradiated from a certain position in the light emitting portion D are incident on the light incident surface 414A, substantially all the light of the partial light beams is not shielded by the light shield plate 4145 but incident on the light incident surface 414A. On the other hand, when the partial light beams generated from the light irradiated from a certain position in the light emitting portion D are shielded by the light shield plate 4145 so as not to be incident on the light incident surface 414A, substantially all the light of the partial light beams is shielded by the light shield plate 4145. Hence, most of the partial light beams incident on the light incident surface 414A is not partially reduced, superposing such partial light beams can illuminate the image formation area of the liquid crystal panel 441 substantially uniformly.

Hence, even when the light emitting portion D is moved in the second direction substantially from the middle of the electrodes 4164, 4165, luminance unevenness on the image formation area can be reduced.

The focal position in the first direction of the first lens 4121 is set in the vicinity of the second lens 4131 on the optical axis of the light beam irradiated from the first lens 4121.

Accordingly, when the light emitting portion D of the light source lamp 416 is moved in the first direction, the light irradiation position in the light emitting portion D determines whether the partial light beams generated from the light passing through the first lens 4121 are incident on the second lens 4131 corresponding to the first lens 4121. That is, when the partial light beams generated from the light irradiated from a certain position in the light emitting portion D are incident on the corresponding second lens 4131, substantially all the light of the partial light beams is incident on the corresponding second lens 4131. On the other hand, when the partial light beams generated from the light irradiated from a certain position in the light emitting portion D are incident on the second lens 4131 next to the corresponding second lens 4131, substantially all the light of the partial light beams is incident on the next second lens 4131. Hence, substantially all the partial light beams incident on the corresponding second lens 4131 are not partially reduced by an amount of some partial light beams which are incident on the next second lens 4131, superposing such partial light beams incident on the corresponding second lens 4131 can illuminate the image formation area of the liquid crystal panel 441 substantially uniformly.

Hence, even when the light emitting portion D is moved in the first direction substantially from the middle of the electrodes 4164, 4165, luminance unevenness on the image formation area can be reduced.

The optical unit 4 is provided with the color-separating optical device 42 which separates the light beam irradiated from the light source device 441 into the three color light beams of red (R), green (G) and blue (B). The liquid crystal panels 441 (441R, 441G and 441B) are provided for each color as the optical modulators. Provided on the downstream of the liquid crystal panels 441 is the cross dichroic prism 445 as the color-combining optical device which combines the modulated color light beams. Accordingly, the color reproducibility can be enhanced and an optical image can be formed with high brightness. Also, since the image formation area of the liquid crystal panel 441 is substantially uniformly illuminated due to the above-described focal position of the first lens 4121, color unevenness in the formed optical image can be reduced. Accordingly, it is possible to reduce color unevenness, to improve color reproducibility and to form an optical image with higher brightness.

Hence, the projector 1 of the first exemplary embodiment can reduce luminance unevenness on the image formation area of the liquid crystal panel 441 and color unevenness of the projected image.

2 Second Exemplary Embodiment

A projector according to the second exemplary embodiment of the invention will be described below.

The projector of the second exemplary embodiment has a similar structure to that of the projector 1 of the first exemplary embodiment, but is different in that the second lens array 413 and the polarization converter 414 of the illumination optical device are disposed reversely. In the description below, the same or substantially the same members already explained above are given the same numeral references and the description thereof will be omitted.

Figure 11:
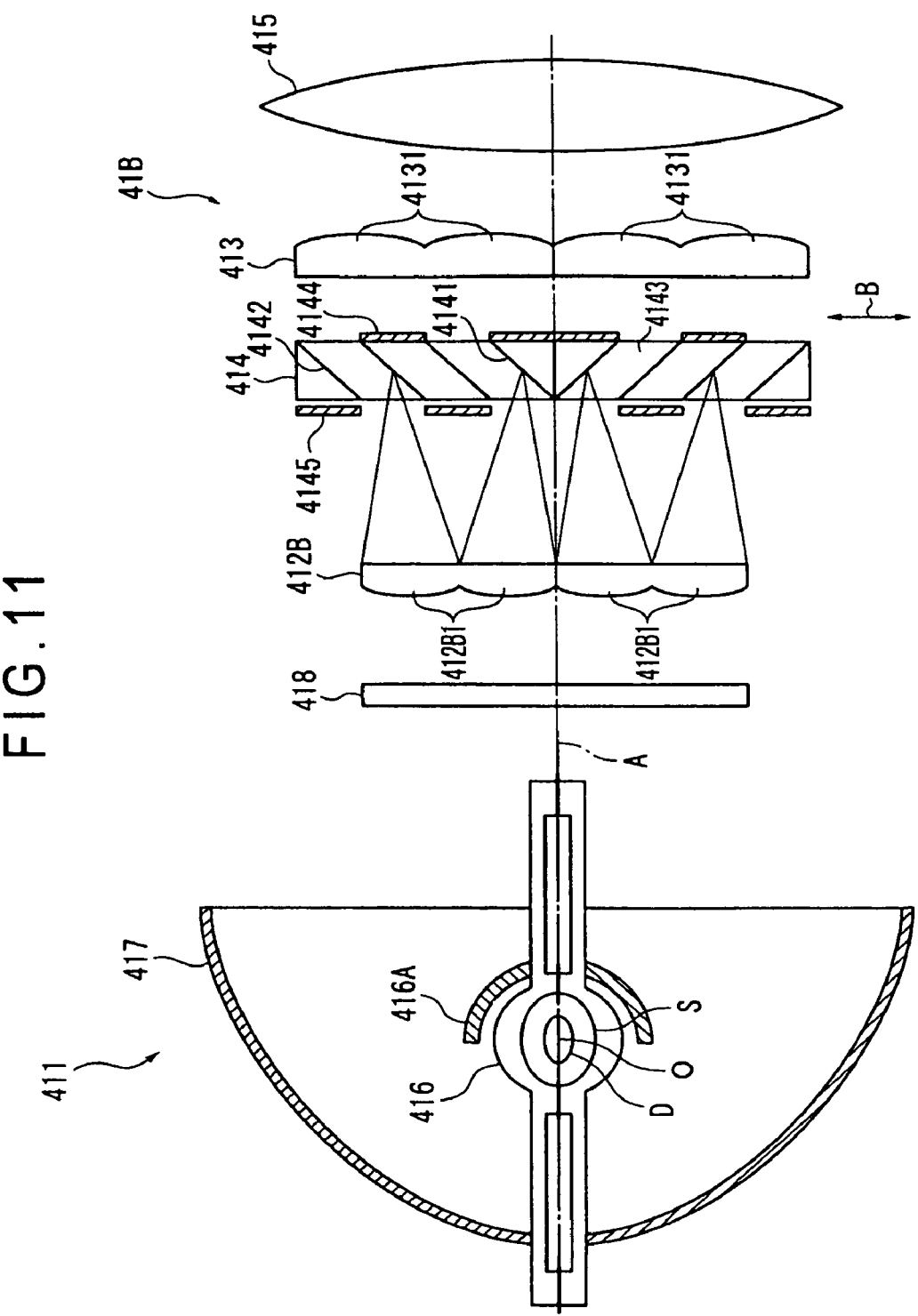
FIG. 11 is a schematic illustration showing a focal position in a second direction of a first lens of a second exemplary embodiment of the invention.
Figure 12:
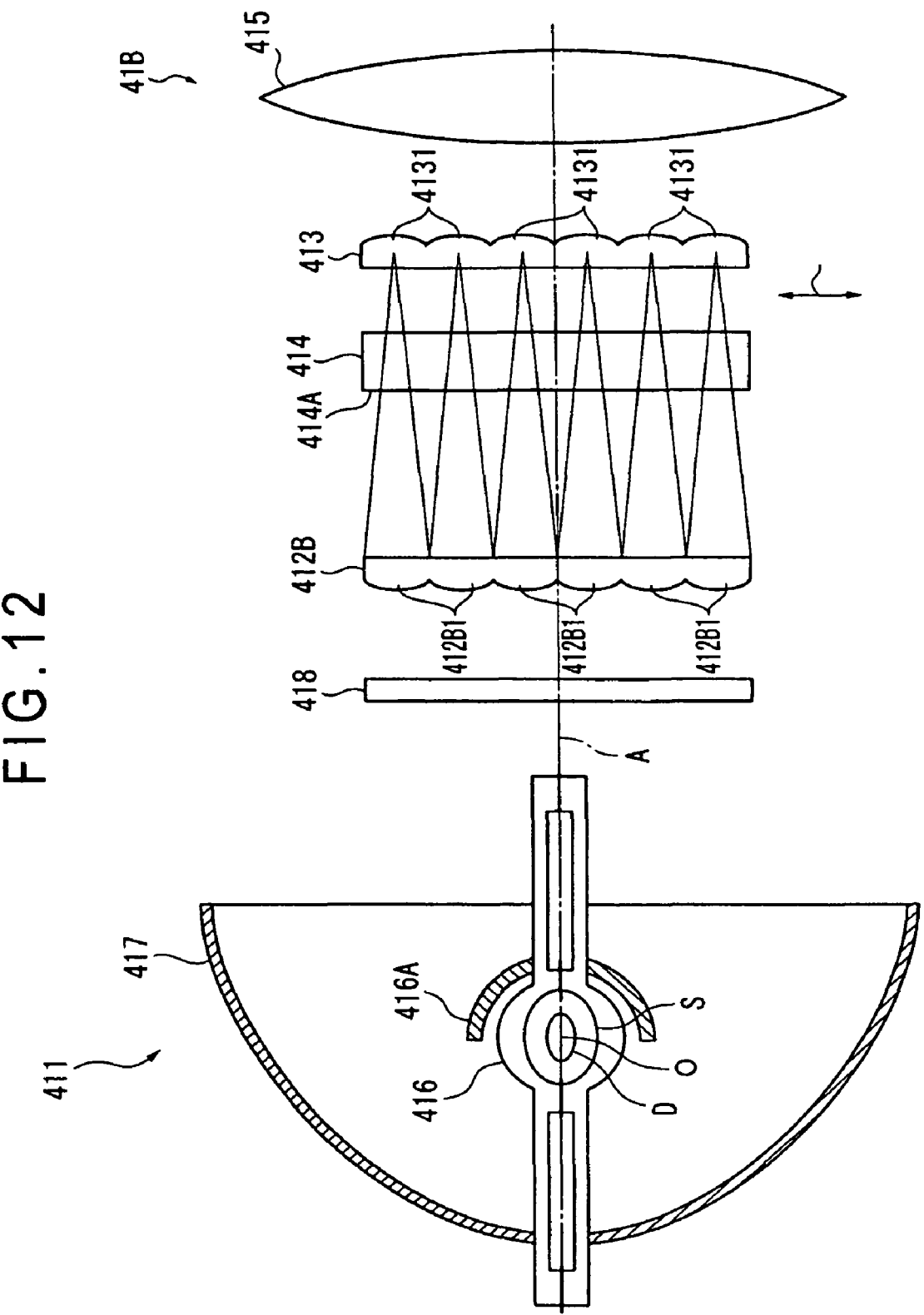
FIG. 12 is a schematic illustration showing a focal position in a first direction of the first lens of the second exemplary embodiment.

FIG. 11 is a schematic illustration showing focal positions in the second direction (the horizontal direction) of first lenses 412B1 of a first lens array 412B. FIG. 12 is a schematic illustration showing focal positions in the first direction (the vertical direction) of the first lenses 4121B1. FIG. 11 is a schematic illustration showing an illumination optical device 41B seen from above. FIG. 12 is a schematic illustration showing the illumination optical device 41B seen from a lateral side.

The projector of the second exemplary embodiment has the similar structure to the above-described projector 1. Specifically, the projector herein also includes the exterior cashing 2, the projection lens 3, the optical unit 4 and the like although not shown in the figures in detail.

The optical unit 4 includes the illumination optical device 41B, the color-separating optical device 42, the relay optical device 43, the electrooptical device 44 and the optical component cashing 45 that accommodates the optical components 41 to 44 and supports the projection lens 3 at a predetermined position in a fixed manner.

As shown in FIGS. 11 and 12, the illumination optical device 41B includes the light source device 411, the first lens array 412B, the second lens array 413, the polarization converter 414 and the superposing lens 415. However, the polarization converter 414 and the second lens array 413 are positioned reversely, which is different from the above-described illumination optical device 41.

The first lens array 412B includes, similarly to the first lens array 412, the first lenses 412B1 (small lenses) having a substantially rectangular shape when seen in the illumination optical axis A direction. The first lens 412B1 divides the light beam irradiated from the light source device 411 into a plurality of partial light beams.

As shown in FIG. 11, the focal position in the second direction (the horizontal direction, arrow B in FIG. 11) of the first lens 412B1 is set in the vicinity of the polarization converter 414 on the optical axis (the central axis of the light beam) of the partial light beam irradiated from the first lens 412B1. More specifically, the focal position in the second direction of the first lens 412B1 is set substantially in the center of the corresponding polarization separating layer 4141 of the polarization converter 414.

As shown in FIG. 12, the focal position in the first direction (the vertical direction, arrow C in FIG. 12) of the first lens 412B1 is set in the vicinity of the second lens array 413 on the optical axis (the central axis of the light beam) of the partial light beam irradiated from the first lens 412B1. More specifically, the focal position in the first direction of the first lens 412B1 is set substantially in the center of the corresponding second lens 4131.

The projector of the second exemplary embodiment provides the same advantages as the above-described projector 1.

Since the focal position in the second direction (the horizontal direction) of the first lens 412B1 is set substantially in the center of the corresponding polarization separating layer 4141 of the polarization converter 414, the illumination region of the light beam incident on the polarization converter 414 via the first lens 412B1 can be small.

Accordingly, when the light emitting portion D of the light source lamp 416 is moved in the second direction and the optical path of the light beam irradiated from the first lens 412B1 is moved in the opposite direction of the movement direction, the light irradiation position in the light emitting portion D determines whether the partial light beams generated from the light having passed through the first lens 412B1 are incident on the light incident surface 414A of the polarization converter 414. Hence, when the partial light beams generated from the light irradiated from a certain position in the light emitting portion D are incident on the light incident surface 414A of the polarization converter 414, substantially all the light of the partial light beams can be incident on the light incident surface 414A. When the partial light beams generated from the light irradiated from a certain position in the light emitting portion D are not incident on the light incident surface 414A of the polarization converter 414 but incident on the light shield plate 4145, substantially all the light of the partial light beams is prevented from being incident on the light incident surface 414A.

Hence, the image formation area of the liquid crystal panel 441 can be substantially uniformly illuminated by the light beams incident on the light incident surface 414A, reducing luminance unevenness on the image formation area and thereby reducing color unevenness of the formed image.

Since the focal position in the first direction (the vertical direction) of the first lens 412B1 is set substantially in the center of the corresponding second lens 4131, the illumination region of the light beam incident on the second lens 4131 via the first lens 412B1 can be small.

Accordingly, when the light emitting portion D of the light source lamp 416 is moved in the first direction and the optical path of the light beam irradiated from the first lens 412B1 is moved in the opposite direction of the movement direction, the light irradiation position in the light emitting portion D determines whether the partial light beams generated from the light passing through the first lens 412B1 are incident on the corresponding second lens 4131. Hence, when the partial light beams generated from the light irradiated from a certain position in the light emitting portion D are incident on the corresponding second lens 4131, substantially all the light of the partial light beams can be incident on the corresponding second lens 4131. While, when the partial light beams generated from the light irradiated from a certain position in the light emitting portion D are incident on the other second lens 4131 next to the corresponding second lens 4131 in the first direction, substantially all the light of the partial light beams can be prevented from being incident on the corresponding second lens 4131.

Hence, the image formation area of the liquid crystal panel 441 can be substantially uniformly illuminated by the light beam incident on the second lens 4131 corresponding to the first lens 412B1, reducing luminance unevenness on the image formation area and thereby reducing color unevenness of the formed image.

3 Modifications of Exemplary Embodiments

The invention is not limited to the above-explained exemplary embodiments, but modifications, improvements and the like are in the scope of the invention as long as an object of the invention can be obtained.

In the exemplary embodiments, the focal position in the second direction of the first lens 4121, 412B1 is set substantially in the center of the corresponding polarization separating layer 4141 of the polarization converter 414 and the focal position in the first direction is set substantially in the center of the corresponding second lens 4131, but the arrangement is not limited thereto. For example, it is only necessary that the focal position in the second direction of the first lens is set in the vicinity of the polarization converter on the optical axis of the light beam (the central axis of the light beam) irradiated from the first lens and that the focal position in the first direction is set in the vicinity of the second lens array 413 on the optical axis of the light beam irradiated from the first lens.

In the exemplary embodiments, the projector 1 is provided with the three liquid crystal panels 441R, 441G and 441B, but the arrangement is not limited thereto. For example, an aspect of the invention is applicable to a projector with two, four or more than four liquid crystal panels. The color-combining optical device that combines color light beams modulated by the liquid crystal panels 441 is the cross dichroic prism 445 in the exemplary embodiments, but a plurality of dichroic mirrors may be alternatively employed.

In the exemplary embodiments, in the plane orthogonal to the illumination axis A, the lengthwise direction of the polarization separating layer 4141 of the polarization converter 414 is defined as the first direction and the direction in which the polarization separating layer 4141 and the reflection layer 4142 are aligned is defined as the second direction, the first direction being a vertical direction, the second direction being a horizontal direction, the second direction being orthogonal to the first direction, but the arrangement is not limited thereto. For example, the first direction may be horizontal and the second direction may be vertical.

In the exemplary embodiments, the optical unit 4 substantially has the L shape in plan view, but the shape thereof may substantially be a U shape in plan view.

The exemplary embodiments employ the transmissive liquid crystal panel 441 having a light beam incident surface and a light beam irradiation surface individually, but may employ a reflective liquid crystal panel having a surface functioning as both of the light incident surface and the light beam irradiation surface.

In the exemplary embodiments, the projector 1 includes the light source device 411 having the sub reflection mirror 416A, but the arrangement is not limited thereto. For example, a light source device not including the sub reflection mirror may be employed.

In the exemplary embodiments, the projector 1 having the liquid crystal panels 441 is taken as an example of the optical modulator. However, another type of optical modulator may be employed as long as the optical modulator forms an optical image by modulating incident light beams in accordance with image information. For example, an aspect of the invention is applicable to a projector using an optical modulator other than a liquid crystal layer such as a micromirror device. When using such optical modulator, the polarization plates 442, 444 on the light beam incident and emitting-sides may be omitted.

In the exemplary embodiments, a front-type projector 1 that projects an image in a direction for observing a screen is taken as an example, but an aspect of the invention is also applicable to a rear-type projector that projects an image in a direction opposite to the direction for observing the screen.

An aspect of the invention is applicable to a projector and especially to a projector including a plurality of optical modulators.

What is claimed is:

1. A projector comprising:
    a light source;
    an optical modulator that modulates a light beam irradiated from the light source in accordance with image information;
    a first lens array having a plurality of first lenses in a plane substantially orthogonal to an optical axis of the light beam irradiated from the light source;
    a second lens array having a plurality of second lenses corresponding to the plurality of first lenses of the first lens array; and
    a polarization converter disposed on a light beam emitting-side of the first lens array, the polarization converter including:
    a polarization separating layer;
    a reflection layer; and
    a phase layer disposed at a position corresponding to either the polarization separating layer or the reflection layer, wherein
    the first lens has a first focal position in a first direction and a second focal position in a second direction, the first focal position being at or near the center of the second lens in the optical axis direction of the light beam irradiated from the first lens, and the second focal position being at or near the center of the polarization separating layer in the optical axis direction of the light beam irradiated from the first lens,
    the first direction is a lengthwise direction of the polarization separating layer in a plane substantially orthogonal to the optical axis of the light beam irradiated from the light source, and
    the second direction is orthogonal to the optical axis of the light beam irradiated from the light source and the first direction, the polarization separating layer and the reflection layer being alternately arranged in the second direction.

2. The projector according to claim 1, further comprising:
    a color-separating optical system that separates the light beam irradiated from the light source into a plurality of color light beams, the optical modulator being provided for each of the plurality of color light beams, and the optical modulators being disposed on each optical path of the plurality of color light beams; and
    a color-combining optical device that combines the plurality of color light beams irradiated from the optical modulators, the color-combining optical device being provided downstream of the optical path of the optical modulators.

3. The projector according to claim 2, wherein the first lens is a toric lens.

4. The projector according to claim 1, wherein the first lens is a toric lens.

5. A projector comprising:
    a light source;
    an optical modulator that modulates a light beam irradiated from the light source in accordance with image information;
    a first lens array having a plurality of first lenses in a plane substantially orthogonal to an optical axis of the light beam irradiated from the light source;
    a second lens array having a plurality of second lenses corresponding to the plurality of first lenses of the first lens array; and
    a polarization converter disposed on a light beam emitting-side of the first lens array, the polarization converter including:
    a polarization separating layer;
    a reflection layer; and
    a phase layer disposed at a position corresponding to either the polarization separating layer or the reflection layer, wherein
    the first lens has a first focal position in a first direction and a second focal position in a second direction, the first focal position being at or in the vicinity of the second lens array in the optical axis direction of the light beam irradiated from the first lens, and the second focal position being at or in the vicinity of the polarization converter in the optical axis direction of the light beam irradiated from the first lens,
    the first direction is a lengthwise direction of the polarization separating layer in a plane substantially orthogonal to the optical axis of the light beam irradiated from the light source, and
    the second direction is orthogonal to the optical axis of the light beam irradiated from the light source and the first direction, the polarization separating layer and the reflection layer being alternately arranged in the second direction.

6. The projector according to claim 5, further comprising:
    a color-separating optical system that separates the light beam irradiated from the light source into a plurality of color light beams, the optical modulator being provided for each of the plurality of color light beams, and the optical modulators being disposed on each optical path of the plurality of color light beams; and
    a color-combining optical device that combines the plurality of color light beams irradiated from the optical modulators, the color-combining optical device being provided downstream of the optical path of the optical modulators.

7. The projector according to claim 6, wherein the first lens is a toric lens.

8. The projector according to claim 5, wherein the first lens is a toric lens.

9. A projector comprising:
    a light source;
    an optical modulator that modulates a light beam irradiated from the light source in accordance with image information;
    a first lens array having a plurality of first lenses in a plane substantially orthogonal to an optical axis of the light beam irradiated from the light source;
    a second lens array having a plurality of second lenses corresponding to the plurality of first lenses of the first lens array; and
    a polarization converter disposed on a light beam emitting-side of the first lens array, the polarization converter including:
    a polarization separating layer;
    a reflection layer; and
    a phase layer disposed at a position corresponding to either the polarization separating layer or the reflection layer, wherein
    the first lens has a first focal position in a first direction and a second focal position in a second direction, the first focal position being at the second lens array or closer to the second lens array than the polarization converter in the optical axis direction of the light beam irradiated from the first lens, and the second focal position being at the polarization converter or closer to the polarization converter than the second lens array in the optical axis direction of the light beam irradiated from the first lens, the first direction is a lengthwise direction of the polarization separating layer in a plane substantially orthogonal to the optical axis of the light beam irradiated from the light source, and the second direction is orthogonal to the optical axis of the light beam irradiated from the light source and the first direction, the polarization separating layer and the reflection layer being alternately arranged in the second direction.

10. The projector according to claim 9, further comprising:
a color-separating optical system that separates the light beam irradiated from the light source into a plurality of color light beams, the optical modulator being provided for each of the plurality of color light beams, and the optical modulators being disposed on each optical path of the plurality of color light beams; and a color-combining optical device that combines the plurality of color light beams irradiated from the optical modulators, the color-combining optical device being provided downstream of the optical path of the optical modulators.

11. The projector according to claim 10, wherein the first lens is a toric lens.

12. The projector according to claim 9, wherein the first lens is a toric lens.

* * * * *